(12) United States Patent
Kitazawa et al.

(10) Patent No.: US 7,130,636 B2
(45) Date of Patent: Oct. 31, 2006

(54) WIRELESS COMMUNICATION APPARATUS AND WIRELESS CHANNEL ASSIGNMENT METHOD

(75) Inventors: Daisuke Kitazawa, Yokohama (JP); Hijin Sato, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1174 days.

(21) Appl. No.: 09/963,537

(22) Filed: Sep. 27, 2001

(65) Prior Publication Data

US 2002/0037729 A1 Mar. 28, 2002

(30) Foreign Application Priority Data

Sep. 28, 2000 (JP) ............................... 2000-297186

(51) Int. Cl.
*H04Q 7/20* (2006.01)
(52) U.S. Cl. .................. 455/452.1; 455/450; 455/451; 370/329
(58) Field of Classification Search ................ 455/450, 455/451, 452.1, 452.2, 453, 423, 509; 370/329, 370/330, 343, 478, 480
See application file for complete search history.

(56) References Cited

U.S. PATENT DOCUMENTS

| | | | |
|---|---|---|---|
| 5,577,087 A | 11/1996 | Furuya | |
| 5,708,973 A | 1/1998 | Ritter | |
| 5,852,780 A | 12/1998 | Wang et al. | |
| 6,198,734 B1 * | 3/2001 | Edwards et al. | 370/347 |
| 6,507,568 B1 * | 1/2003 | Kumar et al. | 370/329 |
| 6,982,969 B1 * | 1/2006 | Carneal et al. | 370/329 |

FOREIGN PATENT DOCUMENTS

| | | |
|---|---|---|
| EP | 0 923 266 | 6/1999 |
| EP | 1030530 A2 * | 8/2000 |
| JP | 9-215049 | 8/1997 |
| JP | 11-178049 | 7/1999 |
| JP | 11-234241 | 8/1999 |
| JP | 2000-69548 | 3/2000 |
| KR | 10-0234041 | 7/1998 |
| WO | WO 96/04722 | 2/1996 |
| WO | WO 01/17311 | 3/2001 |
| WO | WO 01/63855 | 8/2001 |

* cited by examiner

*Primary Examiner*—Melur Ramakrishnaiah
(74) *Attorney, Agent, or Firm*—Oblon, Spivak, McClelland, Maier & Neustadt, P.C.

(57) ABSTRACT

At each wireless terminal, a receiving unit receives a signal transmitted from a wireless base station. A signal-to-noise ratio measurement unit measures an S/N of this received signal. In the wireless base station, data amount measurement unit measures the amount of data stored in each buffer therein. A maximum stay time measurement unit measures a maximum stay time of packets in each buffer. A classification by the maximum stay time unit classifies each wireless terminal based on the maximum stay time. A slot assignment priority order determination unit determines an assignment order of time slots to each wireless terminal based on the classification result in the classification unit, the receiving signal-to-noise ratio, the amount of data, and the maximum stay time.

12 Claims, 17 Drawing Sheets

WIRELESS COMMUNICATION APPARATUS AND WIRELESS CHANNEL ASSIGNMENT METHOD

BACKGROUND OF THE INVENTION

Field of the Invention

The present invention relates to a wireless communication apparatus and a wireless channel assignment method.

FIELD OF THE INVENTION

In a wireless communication apparatus mainly providing a service with sound data, a demand to a so-called multimedia service of data communication of downloading not only sound data but non-sound data, video and still images, etc. has been increasing in recent years. For this reason, offer of multimedia service is indispensable to a future wireless communication apparatus.

When realizing such multimedia service, since communication far more nearly high speed than the case of audio communication is required, the design of a system which performs efficient transmission which uses wireless channels effectively is demanded. For that purpose, it becomes important to aim at effective use of resource by controlling communication quality.

In the related art, communication control for aiming at such efficient transmission is performed in either one of a method based on an amount of data stored in a buffer, and a permissible delay time, and a method based on a signal-to-noise power ratio (S/N ratio) of a received signal. These examples are shown in FIGS. 1 and 2.

FIG. 1 shows a flow chart illustrating a wireless channel assignment method based on the amount of data stored in a buffer and the permissible delay time. In time division multiple access (TDMA) scheme, the wireless channels assigned to each communication terminal is called time slots.

A wireless base station monitors a lapsed time (referred to as "delay time" below) after a packet is stored in each buffer, and determines whether or not this delay time has exceeded a permissible time (referred to as a "permissible value" below) (in a step 1501).

When any packets for each of which the delay time is over the permissible value exist, the wireless base station assigns time slots to each wireless terminal which receives the packet beyond the permissible value in the order of the delay time (in a step 1502). Then, the wireless base station assigns time slots to each wireless terminal which receives the packet for which the delay time is not over the permissible value in the acsending order of the data amount in the buffer (in a step 1503).

Moreover, when the delay time of the packet in each of all the buffers is not over the permissible value (that is, when the negative determination is made in the step 1501), the wireless base station assigns time slots to each wireless terminal in the ascending order of the data amount in the corresponding buffer (in a step 1503). In addition, in the step 1503, time slots are assigned in the acsending order of the data amount in the buffer because the increase in the simultaneously connectable number of wireless terminals can be expected thereby, since the number of time slots occupied thereby decreases when the data amount is small.

Thus, by assigning time slots preferentially to the wireless terminals which receive the packets for each of which the delay time has exceeded the permissible value, the delay time can be prevented from increasing much and efficient transmission can be performed.

FIG. 2 shows a flow chart illustrating a wireless channel assignment method based on the signal-to-noise ratio of a received signal. The wireless base station always monitors the receiving signal-to-noise ratio sent from each wireless terminal (in a step 1601), and assigns time slots sequentially from the wireless terminal having the higher receiving signal-to-noise ratio (in a step 1602).

Thus, when a possibility that a bit error, a packet error, etc. after receiving the signal arise is high since communication quality has deteriorated for example, occurrence of receiving error is prevented as possible by making low the priority of assignment of time slots to the corresponding wireless terminal, and, thus, the efficient transmission can be performed.

However, by the wireless channel assignment method based on the amount of data stored in the buffer and the delay time shown in FIG. 1, since communication quality is not taken into consideration there, the following problems may arise:

For example, in consideration of communication quality deteriorating due to a sharp change in electric wave channel state, such as shadowing, and a packet error occurring, a time slot is again assigned by the method shown in FIG. 1 in order that the packet having that error is to be sent again. However, by the degradation of the communication quality, though the time slot is assigned again, a packet error arises again. Consequently, the amount of data which can be transmitted and received properly within a unit time, i.e., throughput, will decrease, and the transmission efficiency in the whole system will decrease.

On the other hand, by the wireless channel assignment method based on the signal-to-noise ratio of the received signal shown in FIG. 2, since the delay time is not taken into consideration there, even if the requirement against the delay is severe, priority is not given to assignment of a time slot to the wireless terminal in the state where communication quality has deteriorated. By this reason, even for the wireless terminal for which the requirement against the delay is severe, connection with this wireless base station cannot be made, or, even when connection is made, the connection may disconnected during communication. Thus, the delay increases.

SUMMARY OF THE INVENTION

The present invention has been made in view of the problems mentioned above, and an object of the present invention is to achieve effective use of wireless channels, to control the delay time below a desired value, and improve throughput.

In order to attain this object, a wireless communication apparatus (base station) according to the present invention communicates with a plurality of wireless terminals, and includes an assignment order determination part which determines an assignment order of assigning wireless channels between the communication apparatus and the wireless terminal based on the amount of data to be transmitted and the communication quality in a reception end for every wireless terminal, and a wireless channel assignment part which assigns the wireless channels between the communication apparatus and the wireless terminal according to the thus-determined assignment order.

Thus, based on the amount of data to be transmitted in the transmission end for every wireless terminal, the assignment order of the wireless channels is determined. Thereby, wireless channels can be assigned preferentially between the communication apparatus having the smaller amount of data to be transmitted and each relevant wireless terminal, and, thereby, the number of simultaneously connectable wireless terminals can be increased. Thereby, it is possible to increase the number of wireless terminals having no problem in the stay time or the like. Furthermore, by determining the assignment order of wireless channels based on the communication quality in the reception end for every wireless terminal, data can be preferentially communicated between the communication apparatus and each wireless terminal having better communication quality, and, thus, throughput can be raised by decreasing the number of times of possible re-sending of the data. The above-mentioned wireless channel means a time slot in time division multiple access scheme, a frequency band in frequency division multiple access scheme, a spread code in code division multiple access scheme, etc.

Moreover, a communication apparatus according to another aspect of the present invention includes an assignment order determination part which determines the assignment order of wireless channels between the communication apparatus and each wireless terminal based on the maximum stay time of the data to be transmitted in the transmission end for every wireless terminal, and the communication quality in the reception end for every wireless terminal; and a wireless channel assignment part which assigns wireless channels between the communication apparatus and each wireless terminal according to the thus-determined assignment order.

Based on the maximum stay time of the data to be transmitted in the transmission end for every wireless terminal, the assignment order of wireless channels is thus determined, and, thereby, the data having the longer stay time can be transmitted preferentially and thus, the stay time can be effectively reduced in the communication apparatus. Moreover, the assignment order of wireless channels is determined based on the communication quality in the reception end for every wireless terminal, and, thereby, the data can be preferentially communicated between the communication apparatus and each wireless terminal having the better communication quality. Accordingly, the throughput can be raised by decreasing the number of times of possible re-sending of data.

Moreover, the wireless terminals may be classified into first wireless terminals for each of which the maximum stay time of the data to be transmitted or the data to be received has exceeded a predetermined time and second wireless terminals for each of which the maximum stay time of the data to be transmitted or the data to be received has not exceeded the predetermined time. Then, priority may be given to the first wireless terminals over the second wireless terminals in the determination of the assignment order of wireless channels. Then, the assignment order of wireless channels may be determined for the first wireless terminals by the order of the maximum stay time of the data to be transmitted or the data to be received, and then, the order of the communication quality. In contrast thereto, for the second wireless terminals, the assignment order of wireless channels is determined by the order of the communication quality, and, then, the order of the maximum stay time of the data to be transmitted or the data to be received. In this case, wireless channels are thus assigned to those having the longer maximum stay times in the order of the maximum stay time while wireless channels are assigned to those having the shorter maximum stay time in the order of the communication quality. Thereby, wireless channels can be assigned aiming at harmony/compromise between improvement in the stay time and improvement in the throughput.

Moreover, the assignment order of wireless channels may be determined based on the maximum stay time, the amount of the data to be transmitted or the data to be received, and the communication quality. In this case, wireless channels can be assigned preferentially between the communication apparatus and wireless terminals having the smaller amount data to be communicated there, and thereby, the number of wireless terminals having no problem in the stay time etc. can be increased by making the number of wireless terminals connected simultaneously increase.

In particular, the wireless terminals may be classified into first wireless terminals for each of which the maximum stay time of the data to be transmitted or the data to be received has exceeded the predetermined time and second wireless terminals for each of which the maximum stay time of the data to be transmitted or the data to be received has not exceeded the predetermined time. Then, priority may given to the first wireless terminals over the second wireless terminals in determination of the assignment order of wireless channels. Then, the assignment order for the first wireless terminals may be determined by ① the order of the maximum stay time of the data to be transmitted or the data to be received, ② the order of the communication quality, and then ③ the acsending order of the amount of data to be transmitted or the data to be received. In contrast thereto, for the second wireless terminals, the assignment order of wireless channels may be determined by ① the order of the communication quality, ② the acsending order of the amount of data to be transmitted or the data to be received, and, then, ③ the order of the maximum stay time of the data to be transmitted or the data to be received. Thereby, wireless channels can be assigned aiming at harmony/compromise between improvement in the stay time and improvement in the throughput, and, also, the number of wireless terminals having no problem in the stay time etc. can be increased by making the number of wireless terminals connected simultaneously increase.

The assignment order of wireless channels between the communication apparatus and each wireless terminal may be determined based on the number of modulation levels of the digital modulation scheme corresponding to the communication quality in the reception end for every wireless terminal, instead of determining the assignment order of wireless channels between the communication apparatus and each wireless terminal based on the communication quality in the reception end for every said wireless terminal. Thereby, the assignment order of wireless channels can be determined using the number of modulation levels similarly to the case of using the communication quality.

BRIEF DESCRIPTION OF THE DRAWINGS

Other objects and further features of the present invention will become more apparent from the following detailed description when read in conjunction with the accompanying drawings.

DETAILED DESCRIPTION OF THE PREFERRED EMBODIMENTS

Hereafter, embodiments of the present invention will now be described with reference to the figures.

Figure 1:
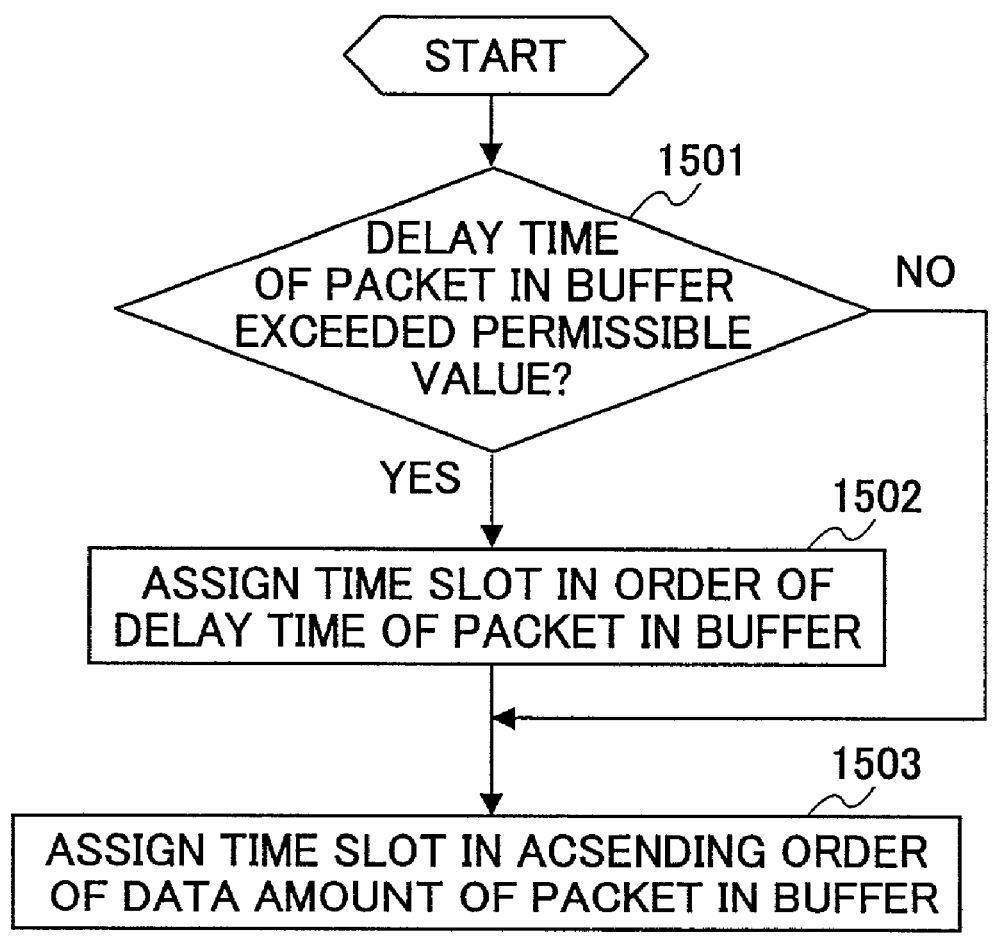
FIG. 1 is a flow chart of a wireless channel assignment method based on an amount of data and a permissible delay time of the data stored in a buffer in the related art.
Figure 2:
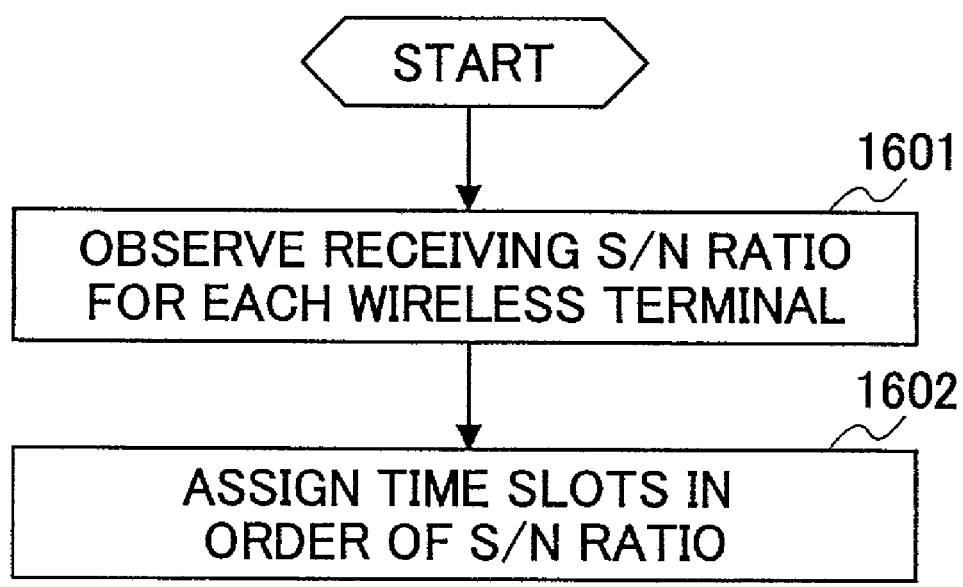
FIG. 2 is a flow chart of a wireless channel assignment method based on a receiving signal-to-noise (S/N) ratio in the related art.
Figure 3:
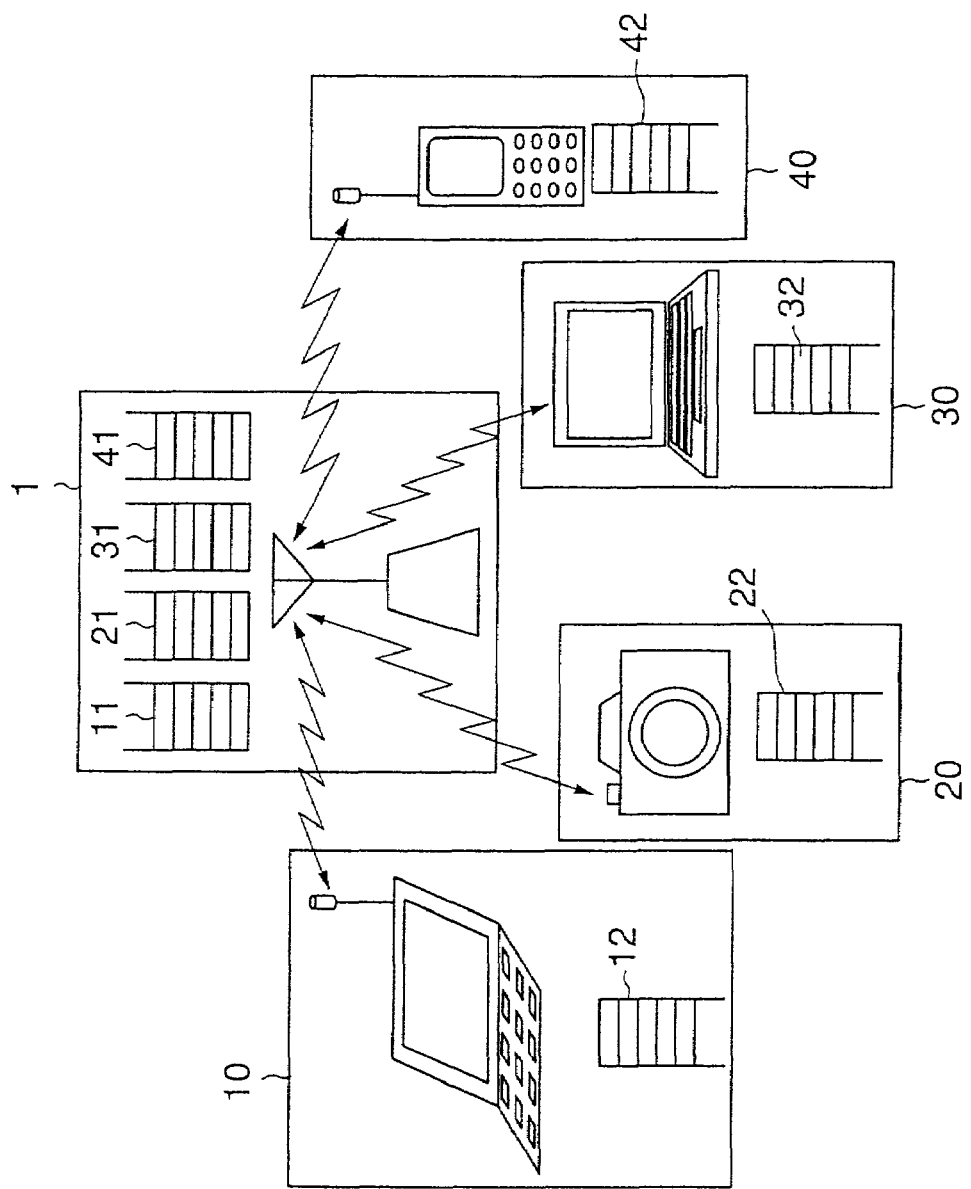
FIG. 3 shows a general configuration of a wireless communication system to which a communication apparatus and a wireless channel assignment method in embodiment of the present invention is applied.

FIG. 3 shows a general configuration of a wireless communication system to which a wireless communication apparatus and a wireless channel assignment method in embodiments of the present invention are applied.

In the wireless communication system shown in FIG. 3, communication is performed between one wireless base station 1 and respective wireless terminals 10, 20, 30 and 40. On occasion of communication between this wireless base station 1 and respective wireless terminals 10 through 40, control in which the wireless base station 1 assigns time slots in time division multiple access scheme to the respective wireless terminals 10 through 40 is performed.

The wireless base station 1 is equipped with buffers 11, 21, 31 and 41 for the respective wireless terminal to be connected therewith. The packets to be transmitted to the wireless terminal 10 are stored in the buffer 11. Similarly, the packets to be transmitted to the wireless terminals 20 through 40 are stored in the respective buffers 21 through 41. On the other hand, the wireless terminals 10 through 40 are equipped with respective buffers 12, 22, 32 and 42 which store the packets to be transmitted to the wireless base station 1.

Figure 4:
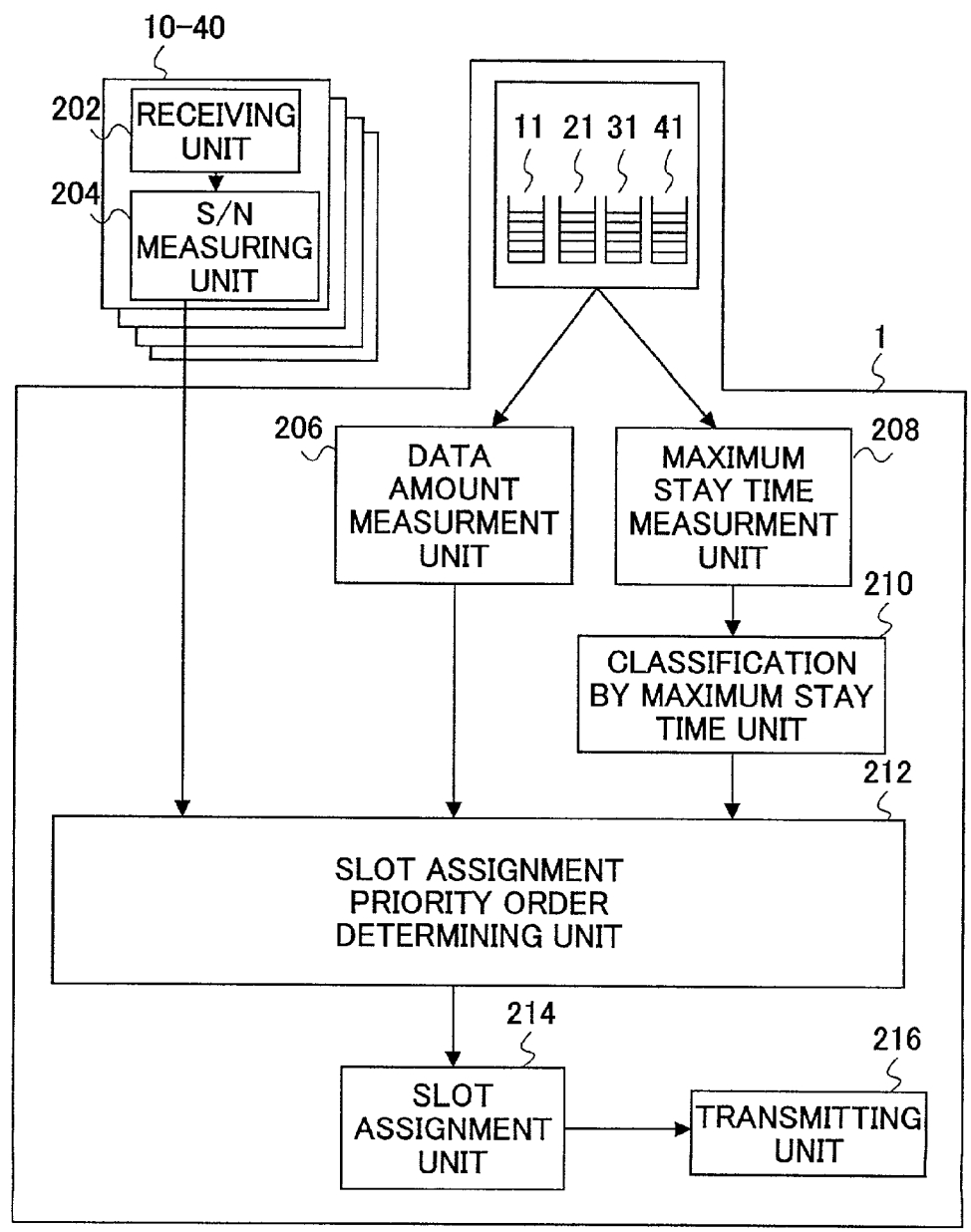
FIG. 4 shows a block diagram illustrating processing of assigning wireless channels to respective wireless terminals in case packets are transmitted to each wireless terminal from a wireless base station.

FIG. 4 shows a block diagram for illustrating processing of assigning time slots to the respective wireless terminals 10 through 40 when packets are transmitted to the respective wireless terminals 10 through 40 from the wireless base station 1.

A receiving unit 202 of each of the respective wireless terminals 10 through 40 receives a signal transmitted from the wireless base station 1, a signal-to-noise ratio measurement unit 204 measures the signal-to-noise ratio (receiving signal-to-noise ratio) of this received signal, and the wireless terminal then transmits it to the wireless base station 1. This receiving signal-to-noise ratio shows the communication quality of the wireless channel which is used for transmitting data to the respective one of the wireless terminals 10 through 40 from the wireless base station 1.

The wireless base station 1 measures the amount of data stored in each of the buffers 11 through 41 in the wireless base station 1 through a data amount measurement unit 206. Moreover, through a maximum stay time measurement unit 208, a stay time (referred to as a "maximum stay time" below) of a packet of the packets which is piled up for a longest time in each of the buffer 11 through 41 is measured.

Through a slot assignment priority order determination unit 212, three parameters, i.e., the receiving signal-to-noise ratio in each of the wireless terminals 10 through 40, the amount of data of each of the buffers 11 through 41 measured by the data amount measurement unit 206, and the maximum stay time of the packets in each of the buffers 11 through 41 measured by the maximum stay time measurement unit 208 are used when an order of assignment of time slots to the respective wireless terminals 10 through 40 is determined. However, before determining this assignment order, the respective wireless terminals 10 through 40 are classified into wireless terminals to which packets in the buffers are transmitted for each of which the maximum stay time has exceeded a predetermined permissible time, and wireless terminals to which packets in the buffers are transmitted for each of which the maximum stay time has not exceed the predetermined permissible time, through a classification by maximum stay time unit 210.

The assignment order is determined as follows:

In the slot assignment order determination unit 210, for the wireless terminals which receive packets from the buffers for each of which the maximum stay time has exceeded the predetermined permissible time, the time slot assignment order is determined by ① the descending order of the maximum stay times of the corresponding buffers, ② the descending order of the corresponding receiving signal-to-noise ratios, and, then, ③ the ascending order of the data amounts in the corresponding buffers; and then, for wireless terminals which receive packets from the buffers for each of which the maximum stay time has not exceeded the predetermined permissible time, the time slot assignment order is determined by ① the descending order of corresponding receiving signal-to-noise ratios, ② the ascending order of data amounts of the corresponding buffers, and, then, ③ the descending order of the maximum stay times of the corresponding buffers.

Thus, after the assignment order of time slots is determined for all the wireless terminals 10 through 40, through the slot assignment unit 214, processing of assigning time slots to the respective wireless terminals 10 through 40 according to this assignment order is performed, and the packets stored in the buffers 11 through 41 are transmitted to the respective wireless terminals 10 through 40 by the transmitting unit 216 using the thus-assigned time slots.

Figure 5:
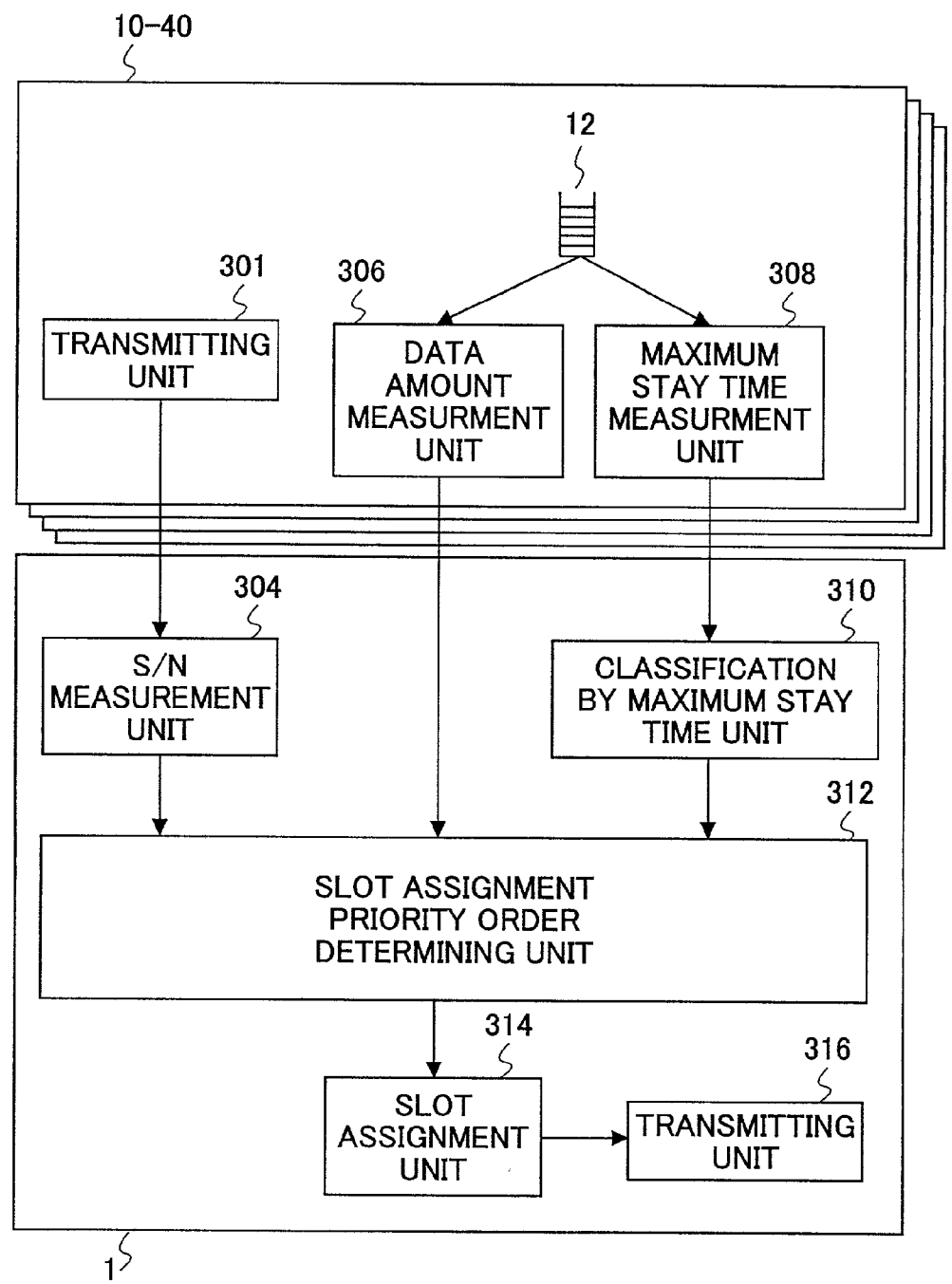
FIG. 5 shows a block diagram illustrating processing of assigning wireless channels to respective wireless terminals in case packets are transmitted from each wireless terminal to a wireless base station.

FIG. 5 shows a block diagram illustrating processing of assigning time slots to respective wireless terminals 10 through 40 when packets are transmitted to the wireless base station 1 from the respective wireless terminals 10 through 40.

Each of the respective wireless terminals 10 through 40 transmits a predetermined signal to the wireless base station 1 by a transmitting unit 301. Then, by a data amount measurement unit 306, the amount of data of a respective one of the built-in buffers 12 through 42 is measured, and the measurement result is transmitted to the wireless base station 1. By a maximum stay time measurement unit 308, the stay time (the maximum stay time) of a packet of the packets which is piled up for a longest time in the respective one of the built-in buffer 12 through 42 is measured, and the measurement result is transmitted to the wireless base station 1.

The wireless base station 1 measures the signal-to-noise ratio for every wireless terminal from the signal received from each of the wireless terminals 10 through 40 by the signal-to-noise ratio measurement unit 304. This receiving signal-to-noise ratio shows the communication quality of the wireless channel which is used for transmitting data to the wireless base station 1 from the respective one of the wireless terminals 10 through 40.

By a slot assignment priority order determination unit 312, three parameters, i.e., the receiving signal-to-noise ratio in a respective one of the wireless terminals 10 through 40 measured by the signal-to-noise ratio measurement unit 304, the maximum stay time of the packets in the buffer 12 through 42 sent from each wireless terminals 10 through 40 and the amount of data of the packets of the buffer are used when the assignment order of time slots to the respective wireless terminals 10 through 40 is determined. However, before determining the assignment order, the wireless terminals are classified into wireless terminals each of which transmits packets from the buffer for which the maximum stay time has exceeded a predetermined permissible time, and wireless terminals each of which transmits packets from the buffer for which the maximum stay time has not exceeded the predetermined permissible time by a classification by maximum stay time unit 310.

The assignment order is determined as follows:

By a slot assignment order determination unit 312, similarly to th slot assignment order determining unit 212 shown in FIG. 4, for the wireless terminals each of which transmits packets from the buffer for which the maximum stay time has exceeded the predetermined permissible time, the assignment order of time slots is determined by ① the descending order of the maximum stay time of the packets in the corresponding buffer, by ② the descending order of the corresponding receiving signal-to-noise ratio and by ③ the ascending order of the amount of data in the corresponding buffer; and, then, for the wireless terminals each of which transmits packets from the buffer for which the maximum stay time has not exceeded the predetermined permissible time, the assignment order of time slots is determined by ① the descending order of the corresponding receiving signal-to-noise ratio, by ② the ascending order of the amount of data in the corresponding buffer and by ③ the descending order of the maximum stay time of the packets in the corresponding buffer.

After the assignment order of time slots is thus determined for all the wireless terminals 10 through 40, by the slot assignment unit 314, processing of assigning time slots to each wireless terminal 10 through 40 according to this assignment order is performed. Each wireless terminal 10 through 40 transmits the packets stored in the built-in buffer 12 through 42 to the wireless base station 1 using the thus-assigned time slots.

Figure 6:
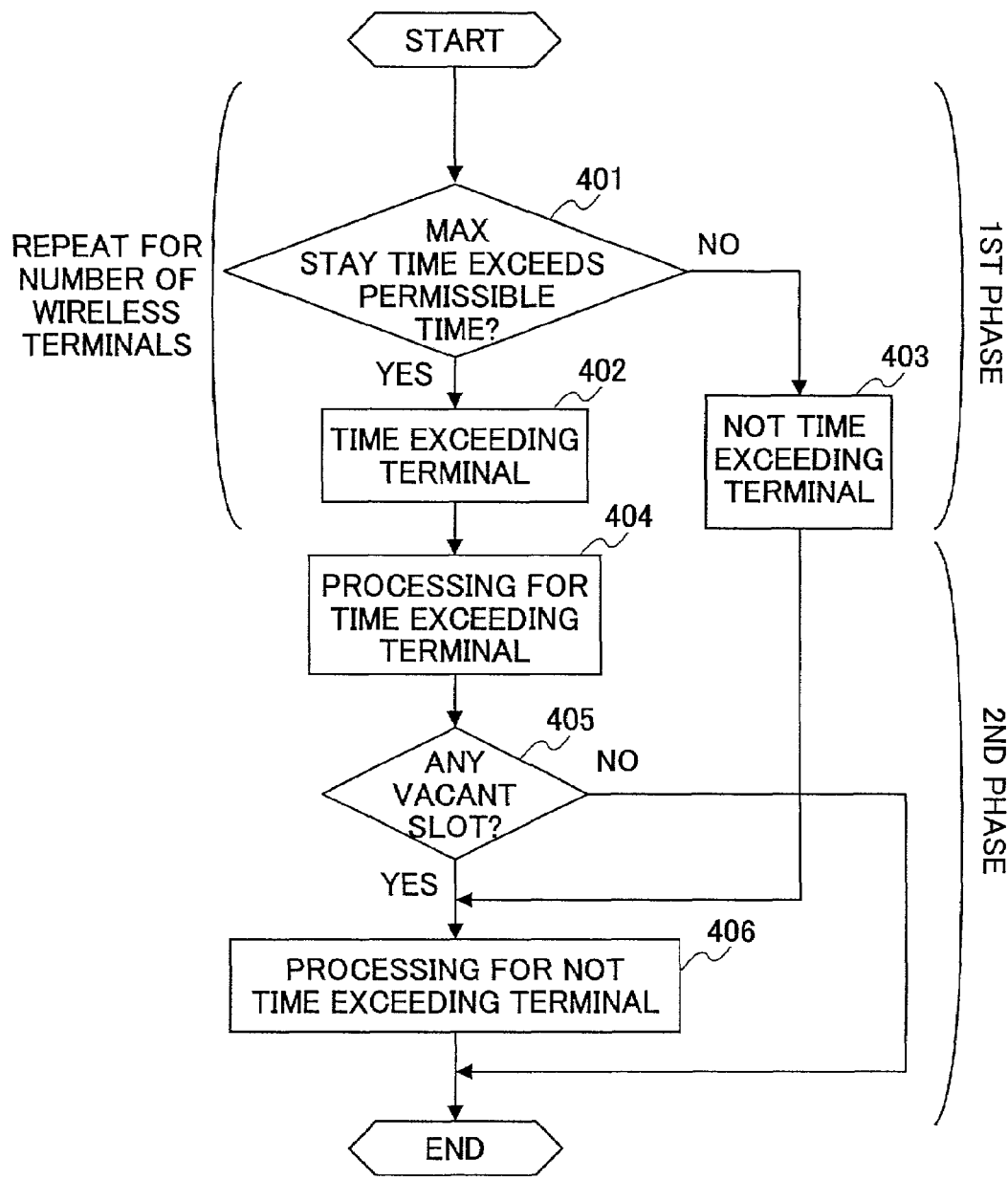
FIG. 6 shows a flow chart of priority order determination processing of time-slot assignment in an embodiment shown in FIGS. 4 and 5.

FIG. 6 shows a flow chart illustrating the above-described processing of priority order determination for slot assignment in the embodiment shown in FIGS. 4 and 5.

A first phase includes processing in that the wireless terminals are classified into those each of which receives or transmits packets from the buffer for which the maximum stay time has exceeded the permissible time (referred to as "the wireless terminals for which the maximum stay time has exceeded the permissible time", hereinafter), after acquiring the three parameters, i.e., the receiving signal-to-noise ratio, data amount in the buffer and maximum stay time, and those for each of which receives or transmits packets from the buffer for which the maximum stay time has not exceeded the permissible time (referred to as "the wireless terminals for which the maximum stay time has not exceeded the permissible time", hereinafter). Then, a second phase includes processing of assignment of time slots based on these three parameters, i.e., the receiving signal-to-noise ratio, the amount of data in the buffer, and the maximum stay time of packets.

As can be seen from FIG. 6, processing of assigning time slots with the priority to the wireless terminals for each of which the maximum stay time has exceeded the permissible time is performed when they exist, and after that, when any vacant slots still exist, processing of assigning time slots to the wireless terminals for each of which the maximum stay time has not exceeded the permissible time is performed.

Figure 7:
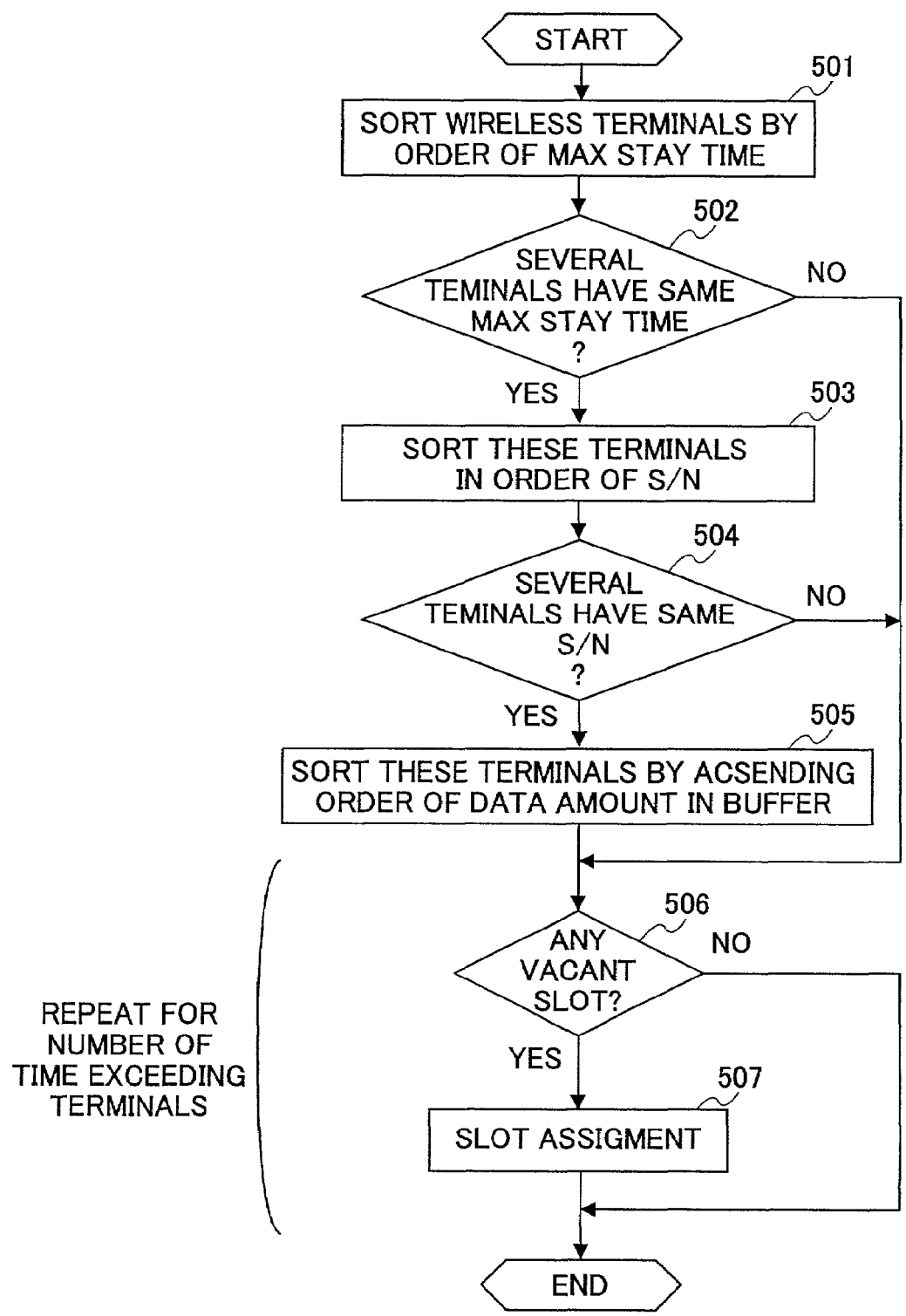
FIG. 7 shows a flow chart illustrating details of processing for wireless terminals for each of which the maximum stay time has exceeded a permissible time in FIG. 6.
Figure 8:
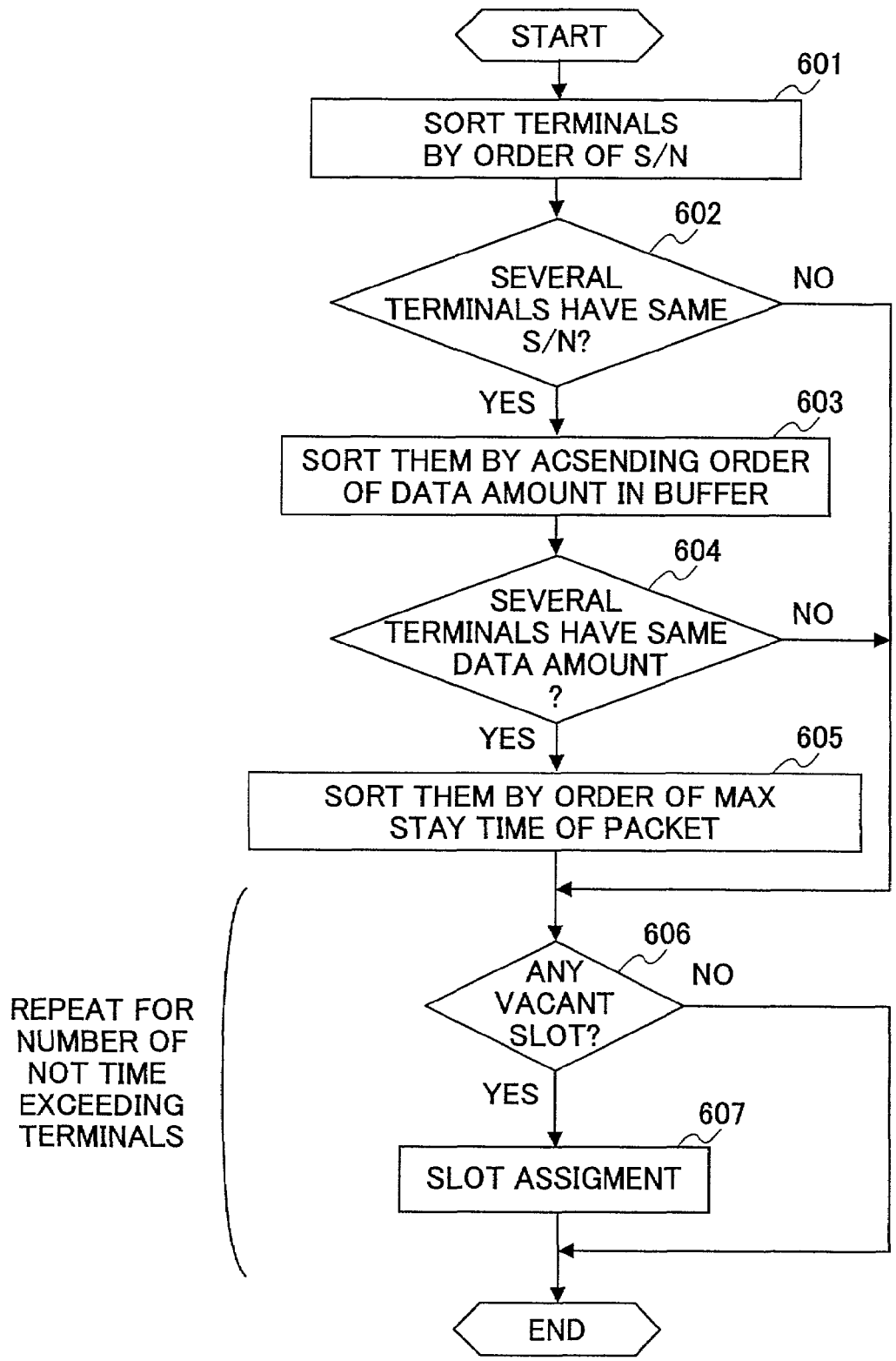
FIG. 8 shows a flow chart illustrating details of processing for wireless terminals for each of which the maximum stay time has not exceeded the permissible time in FIG. 6.

The flow of detailed processing for the wireless terminals for each of which the maximum stay time of the packet has exceeded the permissible time, and for those for each of which the maximum stay time of the packet has not exceeded the permissible time is shown in FIGS. 7 and 8. It is necessary for the wireless base station 1 to grasp, for each wireless terminal 10 through 40, for every period/cycle of performing quality control, the maximum stay time of the packets in the buffer thereof and the amount of data currently accumulated in the buffer thereof. In addition, although the order of assigning time slots is different in the second phase between the case where the maximum stay time of packets has exceeds the permissible time and the other case, the processing of the first phase of classifying the wireless terminal in consideration of the maximum stay time of packets is the same for both cases.

First, processing of the first phase in the embodiment shown in FIG. 6 will now be described. The classification by maximum stay time unit 210/310 determines whether or not the maximum stay time of packets of the acquired three parameters, i.e., the receiving signal-to-noise ratio, the amount of data in the buffer, and the maximum stay time of packets, is over the permissible time (in a step 401), and thereby, classifies it into the wireless terminal for which the maximum stay time has exceeded the permissible time, or the wireless terminal for which it has not exceeded the permissible time (in steps 402 and 403).

Then, processing of the second phase will now be described. First, processing for the wireless terminals for each of which the maximum stay time has exceeded the permissible time is performed (in a step 404). The details of the processing to these wireless terminals are shown in FIG. 7.

The slot assignment priority order determination unit 212/312 sorts each wireless terminal by the order of the maximum stay time so as to assign time slots with the priority to the wireless terminals having the longer maximum stay time so that the delay times in the wireless terminals may not be increased (in a step 501). The thus-obtained sorted order is used as the time-slot assignment order.

However, a plurality of wireless terminals having the same maximum stay time may exist. Then, the slot assignment priority order determination unit 212/312 determines whether or not a plurality of wireless terminals having the same maximum stay time exist (in a step 502). Then, when they exist, for these wireless terminals, the slot assignment priority order determination unit 212/312 sorts them by the order of the receiving signal-to-noise ratio (in a step 503), and thereby, determines the time-slot assignment order therefor.

Here, a plurality of wireless terminals which have also the same receiving signal-to-noise ratio may exist. Then, the slot assignment priority order determination unit 212/312 determines whether or not a plurality of wireless terminals with the same value of receiving signal-to-noise ratio exist (in a step 504), and when they exist, for these wireless terminals, the slot assignment priority order determination unit 212/312 sorts them by the acsending order of the amount of data in the buffer (in a step 505), and thereby determines the time-slot assignment order therefor.

The slot assignment unit 214/314 determines whether or not any vacant slots exist (in a step 506) after the time-slot assignment order is thus determined uniquely for all the wireless terminals for each of which the maximum stay time has exceeded the permissible time. Then, when there are any vacant slots, processing of assigning the vacant slots to the wireless terminals is performed (in a step 507).

Determination processing (in the step 506) of whether or not there are any vacant slots and time-slot assignment processing (in the step 507) are repeated until time slots have been assigned to all the wireless terminals for which the maximum stay time has exceeded the permissible time or no vacant slots to be assigned remain. In addition, when vacant slots exist but are not sufficient for transmitting thereby all the packets in the buffers of the transmission end, the slot assignment unit 214/314 assigns time slots sequentially from those having the longer maximum stay times, and, then, when no vacant slots remain, the time-slot assignment processing is finished (in the step 507).

Description will now be continued by returning to FIG. 6. After the end of the processing (in a step 404) for the wireless terminals for each of which the maximum stay time has exceeded the permissible time, it is determined as to whether or not there are still any vacant slots (in a step 405), and when there are any vacant slots, processing (in a step 406) for the wireless terminals for each of which the maximum stay time has not exceeded the permissible time is performed. The details of the processing for these wireless terminals are shown in FIG. 8.

The slot assignment priority order determination unit 212/312 sorts the respective wireless terminals by the order of the receiving signal-to-noise ratio so as to assign time slots to wireless terminals having the larger receiving signal-to-noise ratios preferentially (in a step 601). The thus-obtained sorted order is used as the time-slot assignment order.

However, since a plurality of wireless terminals having the same receiving signal-to-noise ratio may exist, the slot assignment priority order determining unit 212/312 determines whether or not a plurality of wireless terminals having the same receiving signal-to-noise ratio exist (in a step 602), and when they exist, for these wireless terminals, the slot assignment priority order determination unit 212/312 sorts them by the acsending order of the amount of data in the buffer (in a step 603), and thus determines the time-slot assignment order therefor.

Since a plurality of wireless terminals which have the same amount of data in the buffer may also exist here, the slot assignment priority order determination unit 212/312 determines whether or not a plurality of wireless terminals having the same amount of data in the buffers exist (in a step 604) and, when they exist, for these wireless terminals, the slot assignment priority order determination unit 212/312 sorts them by the order of the maximum stay time (in a step 605), and thereby determines the time-slot assignment order therefor.

The slot assignment unit 214/314 determines whether or not any vacant slots exist (in a step 606) after the time-slot assignment order is thus determined uniquely also for all the wireless terminals for each of which the maximum stay time has not exceeded the permissible time, and, when still there are any vacant slots, processing of assigning the vacant slots to the wireless terminals is performed (in a step 607). The determination processing (in the step 606) of whether or not there are any of vacant slots and the time-slot assignment processing (in the step 607) are repeated until time slots have been assigned to all the wireless terminals for which the maximum stay time has not exceeded the permissible time or no vacant slots remain.

Figure 9:
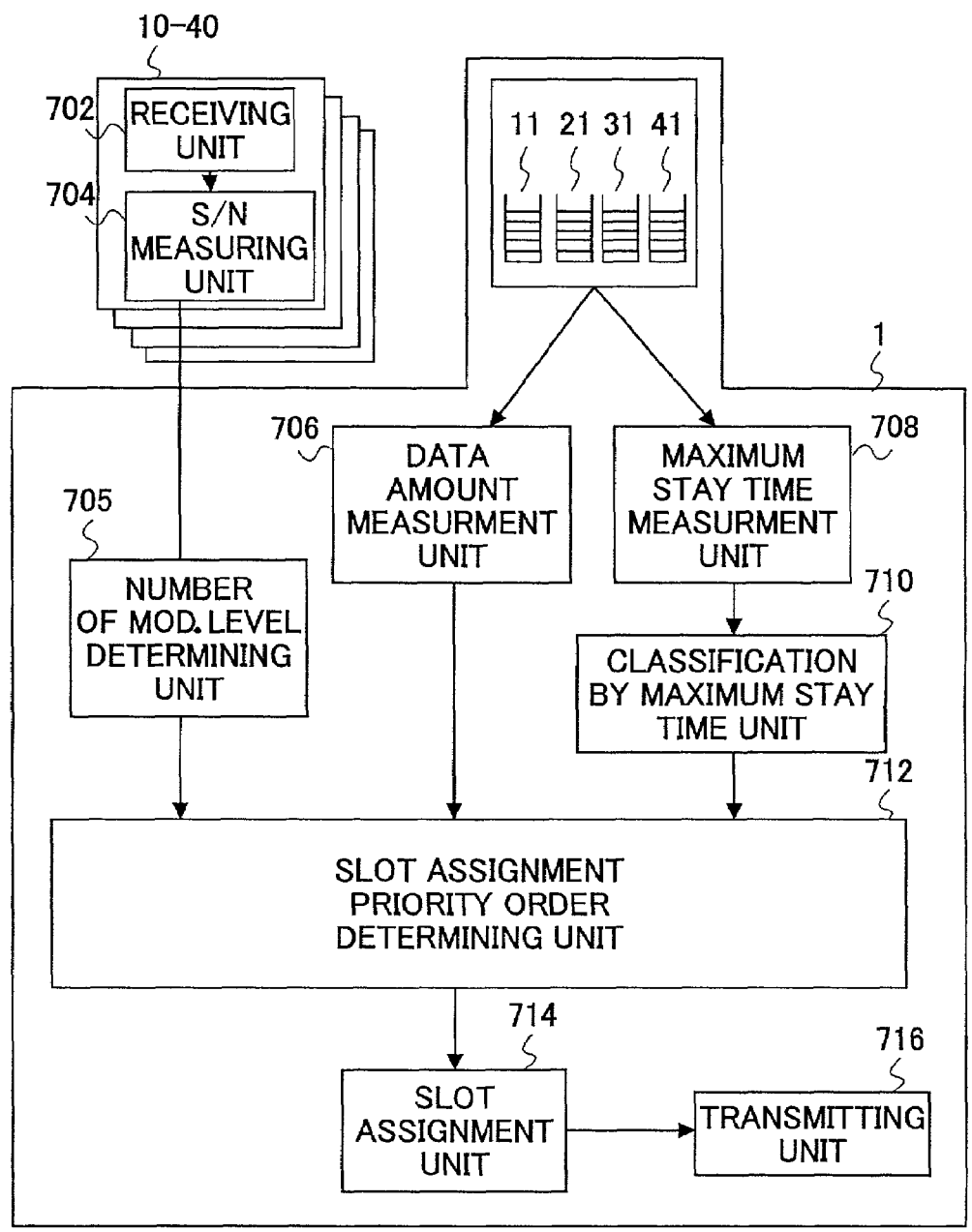
FIG. 9 shows a block diagram illustrating processing of assigning wireless channels for the respective wireless terminals in case packets are transmitted to each wireless terminal from the wireless base station, wherein the number of modulation levels is determined such that a required communication quality may be satisfied.

As described above, based on the maximum stay time of packets, a packet having the longer stay time can be transmitted preferentially and the stay time can thus be effectively reduced. Moreover, based on the receiving signal-to-noise ratio, a packet can be communicated preferentially between the wireless base station 1 and wireless terminal between which the receiving signal-to-noise ratio is higher, and thereby, the throughput can be raised by decreasing the number of times of possible resending of a packet. Furthermore, based on the amount of data in the buffer, a wireless channel can be assigned preferentially between the wireless base station 1 and wireless terminal between which a smaller amount of data is communicated, and, thereby, it is possible to increase the number of wireless terminals connected simultaneously. Thereby, the number of wireless terminals each of which does not have a problem in the stay time can be increased By the way, based on the number of modulation levels, the time-slot assignment order can be determined, instead of using the receiving signal-to-noise ratio. FIG. 9 shows a block diagram illustrating processing of assigning time slots, when packets are transmitted to the respective wireless terminals 10 through 40 from the wireless base station 1, wherein the number of modulation levels is determined such that the required communication quality may be satisfied.

Through a receiving unit 702, each wireless terminal 10 through 40 receives a signal transmitted from the wireless base station 1 similarly to the receiving unit 202 shown in FIG. 4, then measures the signal-to-noise ratio (receiving S/N ratio) of the received signal through a signal-to-noise ratio measurement unit 704, and transmits the measurement result to the wireless base station 1.

Through a number of modulation level determining unit 705, for the received signal-to-noise ratio sent from each wireless terminal 10 through 40, the wireless base station 1 performs processing of determining whether or not the communication quality (for example, the bit error rate and/or packet error rate) required is satisfied, and, reducing the number of modulation levels when the required communication quality is not satisfied.

The three parameters, i.e., the number of modulation levels for every wireless terminal 10 through 40 determined by the number of modulation level determining unit 705, the amount of data in the buffer 11 through 41 measured by the data amount measurement unit 706, and the maximum stay time of packets in each buffer 11 through 41 measured by the maximum stay time measurement unit 708 are used by the slot assignment priority order determination unit 712, when the time-slot assignment order for the respective wireless terminals 10 through 40 is determined. However, before determining this assignment order, a classification by maximum stay time unit 710 previously classifies each wireless terminal into a wireless terminal which receives packet from the buffer for which the maximum stay time has exceeded the predetermined permissible time or a wireless terminal which receives packets from the buffer for which the maximum stay time has not exceeded the predetermined permissible time.

The assignment order is determined as follows:

By the slot assignment order determination unit 712, for the wireless terminal which receives packets from the buffer for which the maximum stay time has exceeded the predetermined permissible time, the time-slot assignment order is determined by ① the descending order of the corresponding maximum stay time of the buffer, ② the descending order of the corresponding number of modulation levels, and, then, ③ the ascending order of the corresponding amount of data in the buffer. Then, for the wireless terminal which receives packets from the buffer for which the maximum stay time has not exceeded the predetermined permissible time, the time-slot assignment order is determined by ① the descending order by the corresponding number of modulation levels, ② the ascending order by the corresponding amount of data in the buffer and then ③ the descending order by the corresponding maximum stay time of the buffer.

After the time-slot assignment order is thus determined for all the wireless terminals 10 through 40, by the slot assignment unit 714, processing of assigning time slots to the respective wireless terminals 10 through 40 according to this assignment order is performed, and the packets stored in buffers 11 through 41 are transmitted to the respective wireless terminals 10 through 40 by the transmitting unit 716 using the thus-assigned time slots.

Figure 10:
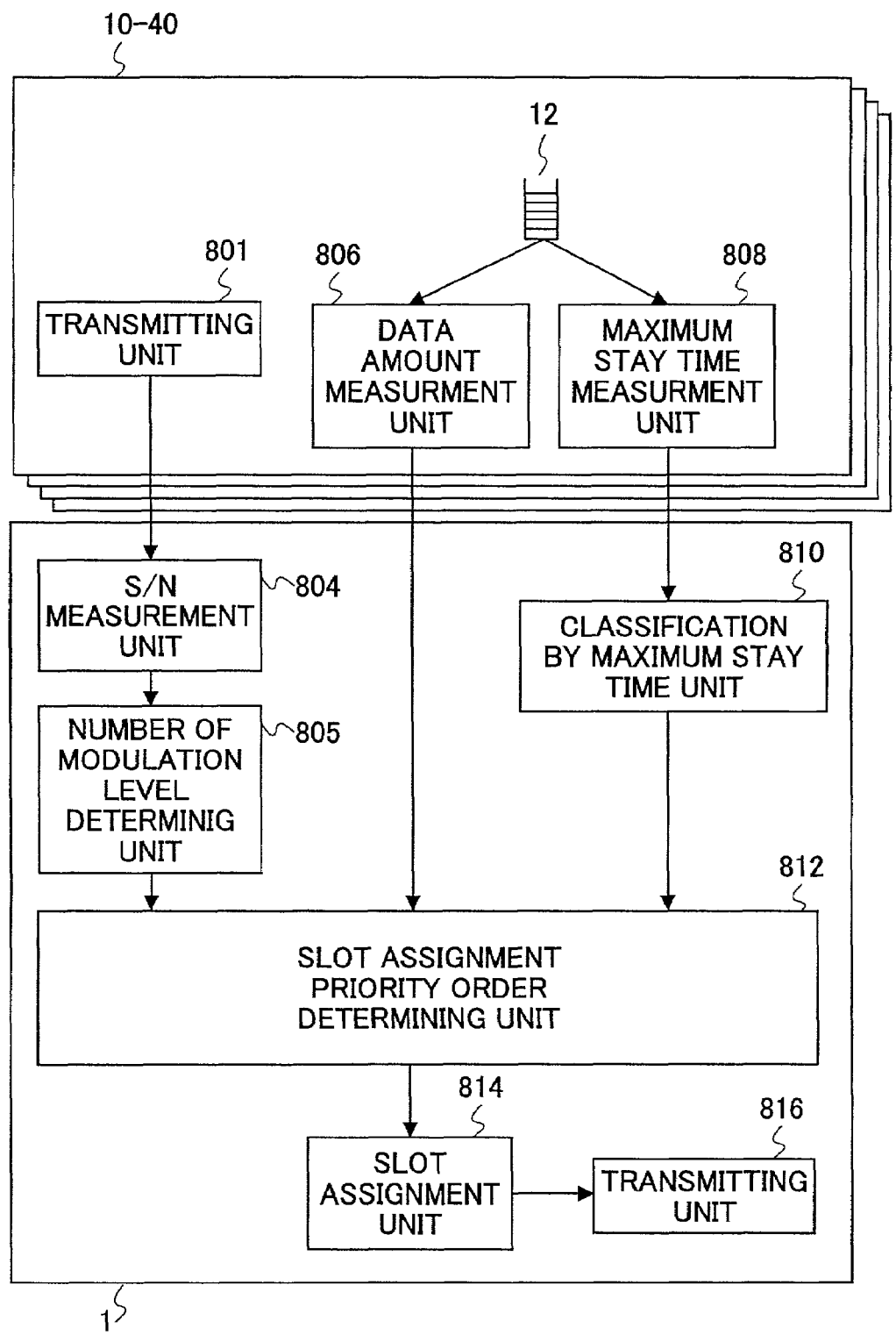
FIG. 10 shows a block diagram illustrating processing of assigning wireless channels for the respective wireless terminals in case packets are transmitted from each wireless terminal to the wireless base station, wherein the number of modulation levels is determined such that a required communication quality may be satisfied.

FIG. 10 shows a block diagram illustrating processing of assigning wireless channels to the respective wireless terminals 10 through 40, when packets are transmitted to the wireless base station 1 from the respective wireless terminals 10 through 40, wherein the number of modulation levels is determined such that the required communication quality may be satisfied.

Each wireless terminal 10 through 40 transmits a predetermined signal to the wireless base station 1 by a transmitting unit 801. Moreover, by a data amount measurement unit 806, the amount of data in the built-in buffer 12 through 42 is measured, and the measurement result is transmitted to the wireless base station 1. By a maximum stay time measurement unit 808, the stay time (the maximum stay time) of a packet which is piled up for a longest time of the packets stored in the built-in buffer 12 through 42 is measured, and the measurement result is transmitted to the wireless base station 1.

The wireless base station 1 measures the signal-to-noise ratio for every wireless terminal from the signal received from each wireless terminals 10 through 40 by a signal-to-noise ratio measurement unit 804. Moreover, by a number of modulation level determination unit 805, for the receiving signal-to-noise ratio, it is determined whether or not the required communication quality is satisfied, and, when it is not satisfied, the number of modulation levels is reduced.

By a slot assignment priority order determination unit 812, three parameters, i.e., the number of modulation levels for every wireless terminal 10 through 40 determined by the number of modulation level determination unit 805, the maximum stay time of packets in the buffer 12 through 42 sent from every wireless terminal 10 through 40 and the amount of data in the buffer are used, when the time-slot assignment order for the respective wireless terminals 10 through 40 is determined. However, before determining the assignment order, a classification by maximum stay time unit 810 classifies each wireless terminal into a wireless terminal which transmits a packet stored from the buffer for which the maximum stay time has exceeded the predetermined permissible time or a wireless terminal which transmits a packet stored in the buffer for which the maximum stay time has not exceeded the predetermined permissible time, for each of the wireless terminals 10 through 40.

The assignment order is determined as follows:

By the slot assignment order determination unit 812, for the wireless terminal which transmits packets stored in the buffer for which the maximum stay time has exceeded the predetermined permissible time, similar to the slot assignment order determination unit 712 shown in FIG. 9, by ① the order of the corresponding maximum stay time of the buffer, ② the order of the corresponding number of modulation levels and then ③ the acsending order of the corresponding amount of data in the buffer, the time-slot assignment order is determined. Then, for the wireless terminal which transmits packets stored in the buffer for which the maximum stay time has not exceeded the predetermined permissible time, the time-slot assignment order is determined by ① the order of the corresponding number of modulation levels, ② the ascending order of the corresponding amount of data in the buffer, and then ③ the order of the corresponding maximum stay time of packets in the buffer.

After the time-slot assignment order is thus determined for all the wireless terminals 10 through 40, a slot assignment unit 814 assigns time slots to the respective wireless terminals 10 through 40 according to this assignment order. Each wireless terminal 10 through 40 transmits the packets stored in the built-in buffer 12 through 42 to the wireless base station 1 using the thus-assigned time slots.

Figure 11:
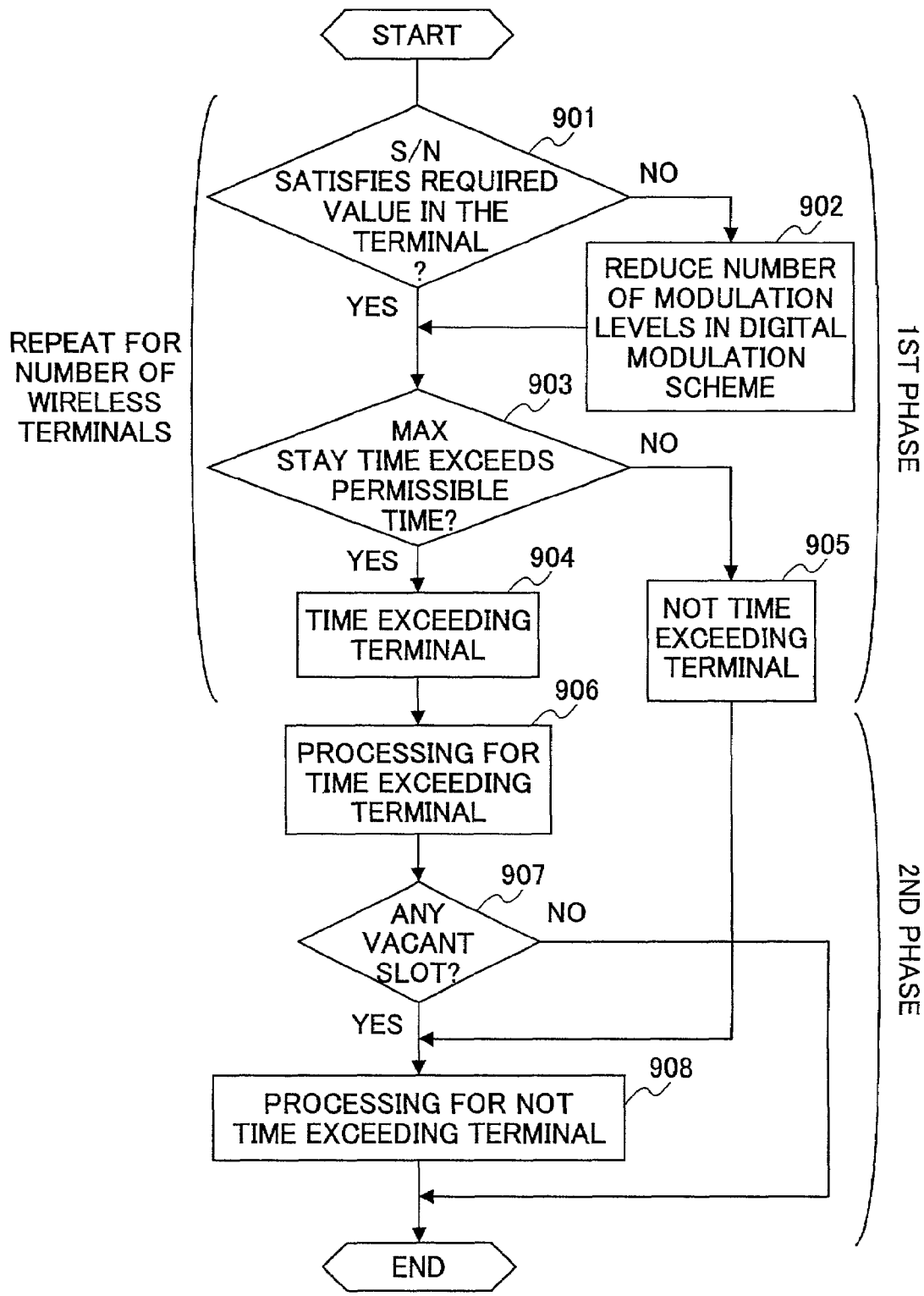
FIG. 11 shows a flow chart of priority order determination processing of time-slot assignment in an embodiment shown in FIGS. 9 and 10.

FIG. 11 shows a flow chart illustrating the priority order determination processing for slot assignment in the embodiment shown in FIGS. 9 and 10.

When the receiving signal-to-noise ratio does not satisfy the required receiving quality after the three parameters, i.e., the receiving signal-to-noise ratio, the amount of data in the buffer, and the maximum stay time are obtained, the number of modulation levels of the corresponding wireless terminal is lowered, then, the wireless terminal is classified into a wireless terminal for which the maximum stay time has exceeded the permissible time or a wireless terminal for which the maximum stay time has not exceeded the permissible time. Thus, a first phase is performed. Then, in a second phase, based on the three parameters, i.e., the number of modulation levels, the amount of data in the buffer, and the maximum stay time, the time-slot assignment processing is performed.

Figure 13:
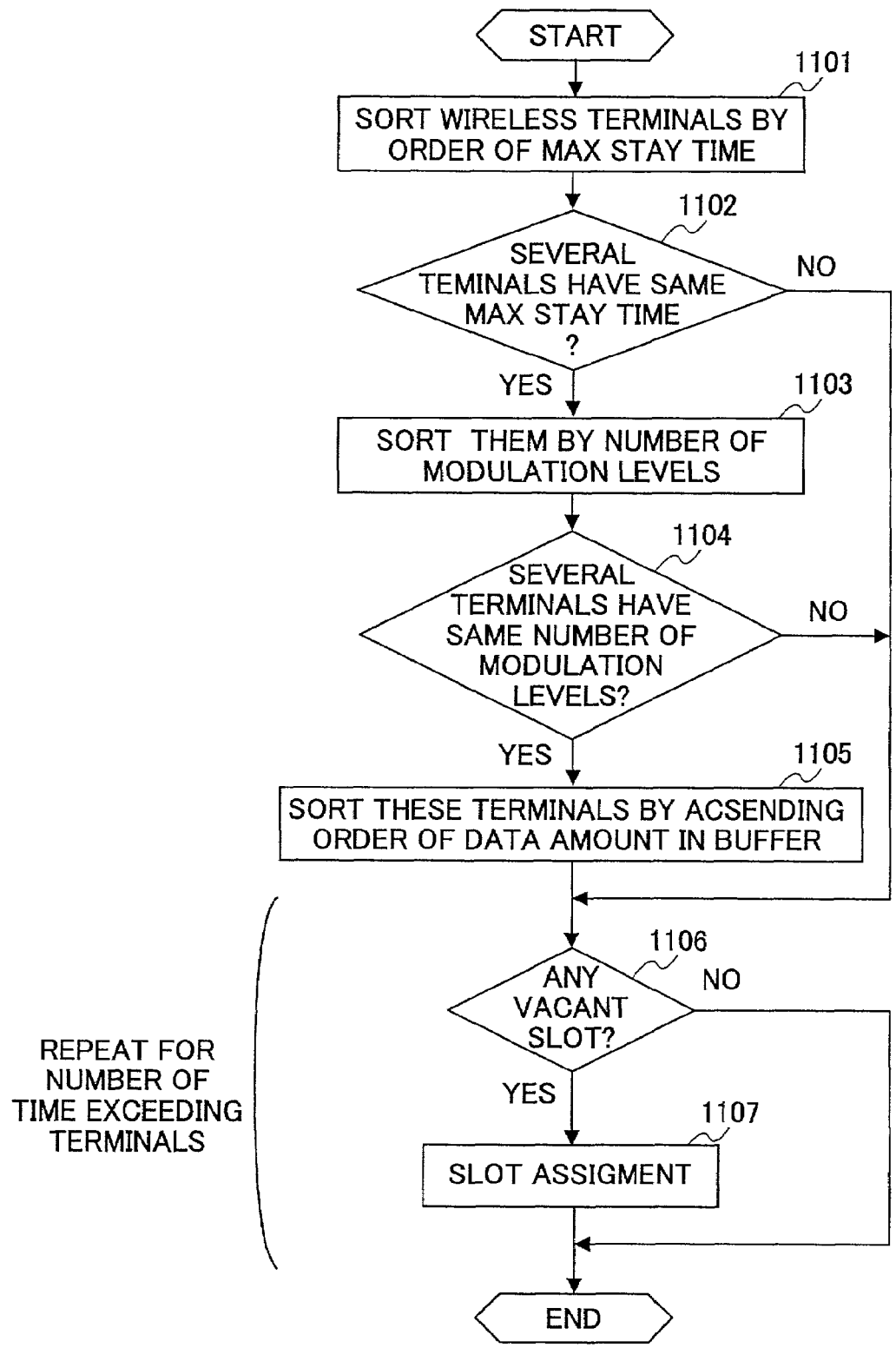
FIG. 13 shows a flow chart illustrating details of the processing for wireless terminals for each of which the maximum stay time has exceeded a permissible time in FIG. 11.
Figure 14:
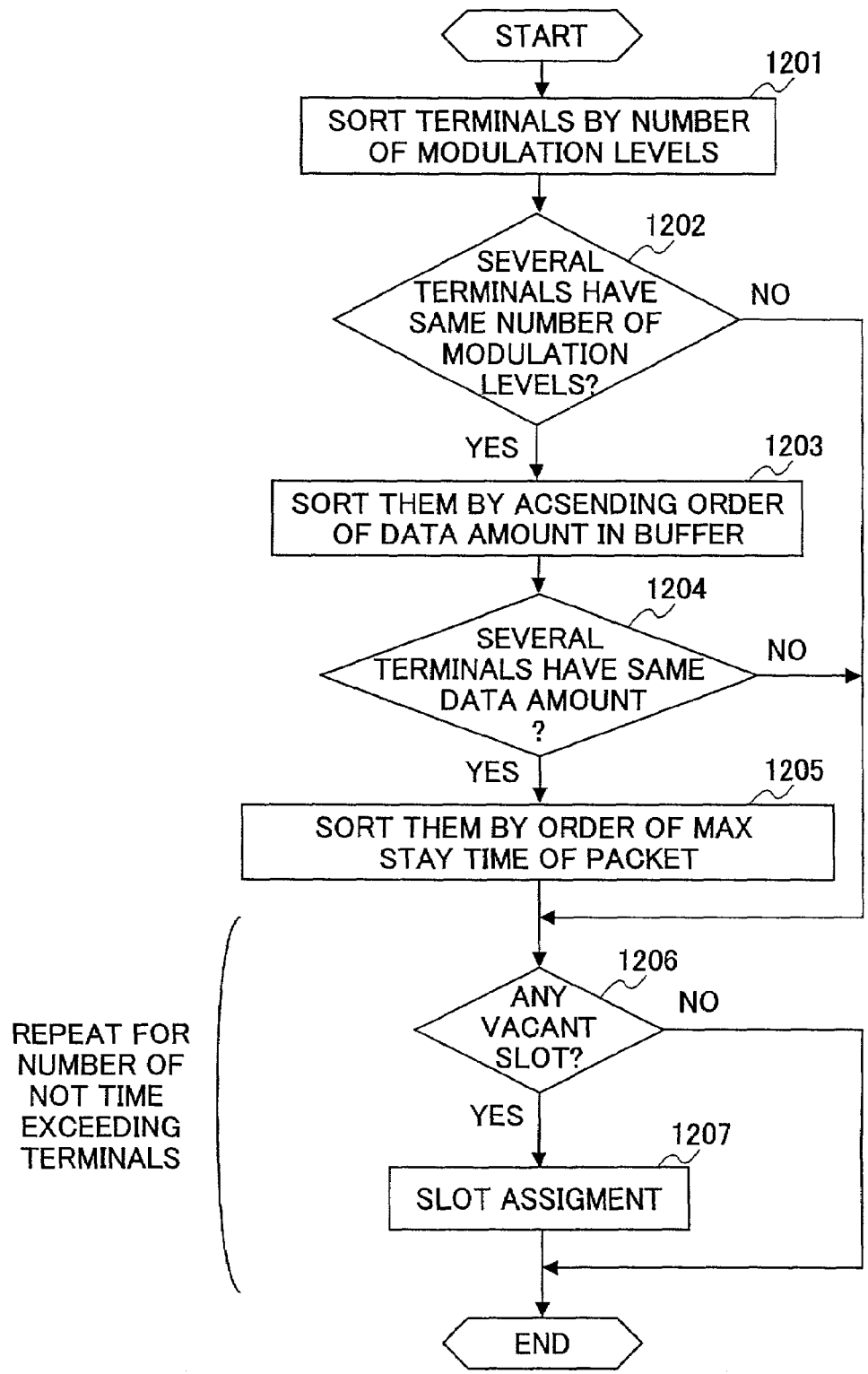
FIG. 14 shows a flow chart illustrating details of the processing for wireless terminals for each of which the maximum stay time has not exceeded the permissible time in FIG. 11.

As can be seen from FIG. 11, processing of assigning time slots with the priority to wireless terminals each having the maximum stay time having exceeded the permissible time if they exist is performed, and after that, when any vacant slots still exist, processing of assigning time slots to the wireless terminals for each of which the maximum stay time has not exceeded the permissible time is performed. FIGS. 13 and 14 show flows of detailed processing for the wireless terminals for each of which the maximum stay time has exceeded the permissible time, and wireless terminals for each of which it has not exceeded the permissible time, respectively. It is necessary for the wireless base station 1 to grasp the current data amount accumulated in the buffer, and the maximum stay time of the packets in the buffer, for each of the wireless terminals 10 through 40, for each period/cycle of performing quality control. In addition, although the time-slot assignment order in the second phase differs between the case where the maximum stay time of the packets in the buffer has exceeded the permissible time and the other case, processing of the first phase of classifying the wireless terminal in consideration of the maximum stay time of the packets is the same for both cases.

Moreover, in the present embodiment, the processing of determining the number of modulation levels by the receiving signal-to-noise ratio acquired for every fixed cycle, and the processing of determining the time-slot assignment order, i.e., processing of assigning time slots, may be performed independently from one another. For example, in an environment which a received signal changes violently, a frequency of acquiring the receiving signal-to-noise ratio, and thereby determining the number of modulation levels can be increased. On the other hand, a frequency of determining the time-slot assignment order can be determined according to the rate in traffic change. In this case, the number of modulation levels at the time of performing the slot assignment processing is used as the information of the number of modulation levels used when time slots are assigned.

However, when the cycle of processing of determining the number of modulation levels is coincide with the cycle of the processing of assigning time slots, the efficiency of utilization of wireless channels can be raised. Therefore, the case where the processing of determining the number of modulation levels and processing of assigning time slots are performed at the same cycle will now be described.

The processing of the first phase in the embodiment shown in FIG. 11 will now be described. The number of modulation level determination unit 705/805 pays attention to the acquired receiving signal-to-noise ratio, and determines whether or not the receiving signal-to-noise ratio satisfies the required value (in a step 901). The number of modulation level determination unit 705/805 performs processing of reducing the number of modulation levels of the corresponding wireless terminal when the required value is not satisfied (in a step 902).

On connection between the wireless terminal and wireless base station, in the preceding number-of-modulation-level-determination processing, the usable maximum number of modulation levels is determined, and is used, in order to increase the amount of information which can be transmitted at once and to raise the use efficiency of wireless channels. That is, the electric power of the received signal, and noise and interference electric power are measured, and thereby, the receiving signal-to-noise ratio is acquired. Then, under the condition of this receiving signal-to-noise ratio, the maximum number of modulation levels by which the rate of bit error and/or packet error which is one of the required receiving quality can be satisfied is determined, and is used for the subsequent communication.

However, in the electric wave environment of wireless communication, the receiving signal-to-noise ratio always varies also during communication, and, in addition, as the number of modulation levels is made larger, influence of the noise and/or interference increases accordingly, and, thereby, the rate of bit error and/or the rate of packet error increases. Communication quality should be maintained by reducing the number of modulation levels, even if it sacrifices the use efficiency of wireless channels, since otherwise it becomes impossible to satisfy the rate of bit error etc. when the receiving signal-to-noise ratio becomes less than the required value due to change in the received signal, increase in the interference electric power, or the like.

Figure 12:
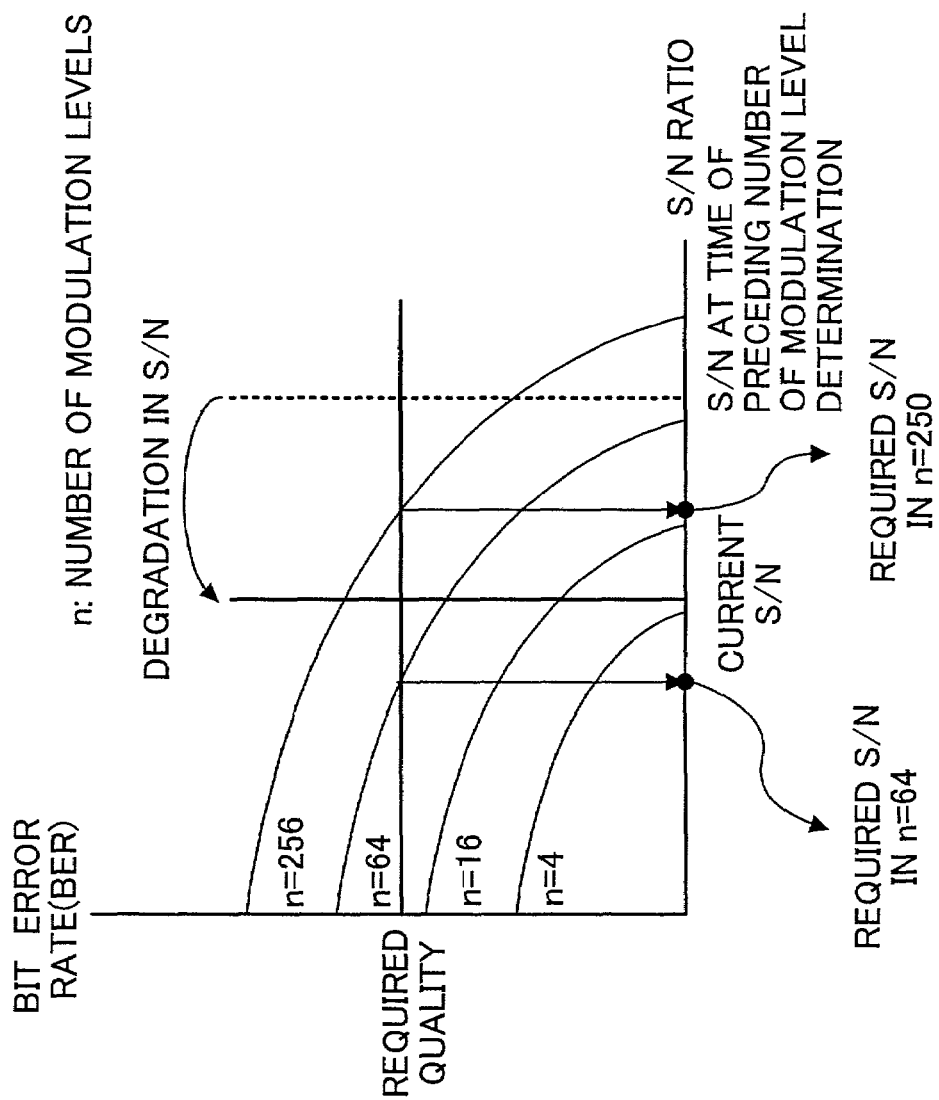
FIG. 12 shows a relationship between required communication quality and receiving signal-to-noise ratio in various numbers of modulation levels.

An example will now be given and described with reference to FIG. 12 for the processing of reducing the number of modulation levels. The graph of this figure shows a relationship between the required receiving signal-to-noise ratio and required communication quality (rate of bit error: BER) in various numbers 'n' of modulation levels. In the example shown, under the condition of the receiving signal-to-noise (S/N) ratio at the time of determining the number of modulation levels precedingly, the required rate of bit error can be satisfied even when any one of the numbers of modulation levels of n=4 through 256 shown is employed. However, in order that wireless channels should be used efficiently, since it is thus necessary to use as large number of modulation levels as possible, it is determined that n=256, and the required receiving signal-to-noise ratio in n=256 is obtained.

Then, when the present receiving signal-to-noise ratio is less than the required receiving signal-to-noise ratio in n=256 due to a change of a subsequent received signal, increase of interference electric power, etc., it becomes impossible to satisfy the above-mentioned required rate of bit error. Then, the number of modulation levels is reduced such that n=64 which is the maximum number of modulation levels in which the rate of bit error can be satisfied, from n=256, under the condition of the current receiving signal-to-noise (S/N) ratio. Furthermore, the required receiving signal-to-noise ratio in n=64 is obtained, and, whenever processing of determining the number of modulation levels is performed subsequently, comparison thereof with the receiving signal-to-noise ratio at the time is performed.

Here, it is possible to use the theoretical value of the electric wave environment nearest to that of the system as the relationship between the receiving signal-to-noise ratio and the rate of bit error. Moreover, the wireless base station which determines the number of modulation levels may previously have such information of characteristics concerning the electric wave propagation channels in a form of a table, for example, and this may be referred to at the time the number of modulation levels is determined.

In addition, when the minimum number of modulation levels previously determined in the system is used, the processing of reducing the number of modulation levels further from that number is not performed, and the next processing is performed.

Description will now be continued with reference FIG. 11 again. The classification by maximum stay time unit 710/810, as described above, after the number of modulation levels is determined based on the receiving signal-to-noise ratio, determines whether or not the maximum stay time, of the three parameters, i.e., the number of modulation levels, the amount of data in the buffer, and the maximum stay time, is over the permissible time (in a step 903), and thereby, classifies the relevant wireless terminal into a wireless terminal for which the maximum stay time has exceeded the permissible time, or a wireless terminal for which it has not exceeded the permissible time (in steps 904 and 905).

Then, processing of the second phase will now be described. First, processing for the wireless terminals for each of which the maximum stay time has exceeded the permissible time is performed (in a step 906). The details of the processing to these wireless terminals are shown in FIG. 13.

A slot assignment priority order determination unit 712/812 sorts each wireless terminal by the order of the maximum stay time so as to assign time slots with the priority to the wireless terminals having the larger maximum stay times so that the delay times of wireless terminals may be prevented from increasing (in a step 1101). The thus-obtained order is used as the time-slot assignment order.

However, since a plurality of wireless terminals having the same maximum stay time may exist, the slot assignment priority order determination unit 712/812 determines whether a plurality of wireless terminals having the same maximum stay time exist (in a step 1102). When they exist, for these wireless terminals, sorting is performed by the order of the number of modulation levels (in a step 1103), and thereby, the time-slot assignment order therefor is determined.

Since a plurality of wireless terminals having the same number of modulation levels may also exist here, the slot assignment priority order determination unit 712/812 determines whether a plurality of wireless terminals having the same number of modulation levels exist (in a step 1104). When they exist, for these wireless terminals, sorting is performed by the acsending order of the amount of data in the buffer (in a step 1105), and thereby, the time-slot assignment order therefor is determined.

Then, after the time-slot assignment order is thus determined uniquely for all the wireless terminals for each of which the maximum stay time has exceeded the permissible time, the slot assignment unit 714/814 determines whether or not any vacant slots exist (in a step 1106). When there are any vacant slots, processing of assigning the vacant slots to the wireless terminals is performed (in a step 1107). The determination processing (in the step 1106) of whether there are any vacant slots and the time-slot assignment processing (in the step 1107) are repeated until time slots have been assigned to all the wireless terminals for each of which the maximum stay time has exceeded the permissible time or no vacant slots remain.

Again, returning to FIG. 11, and description will now be continued. When it is determined, after the end of the processing (in the step 906) for the wireless terminals for each of which the maximum stay time have exceeded the permissible time, it is determined whether or not there are still any vacant slots (in a step 907), and when there are any vacant slots, processing (in a step 908) for the wireless terminals for each of which the maximum stay time has not exceeded the permissible time is performed. The details of the processing for these wireless terminals are shown in FIG. 14.

The slot assignment priority order determination unit 712/812 sorts each wireless terminal by the order of the number of modulation levels so as to assign time slots to a wireless terminal having the larger number of modulation levels preferentially (in a step 1201). The thus-obtained order is used as the time-slot assignment order.

However, since a plurality of wireless terminals having the same number of modulation levels may exist, the slot assignment priority order determination unit 712/812 determines whether or not a plurality of wireless terminals having the same number of modulation levels exist (in a step 1202). When they exist, for these wireless terminals, sorting is performed by the ascending order of the amount of data in the buffer (in a step 1203), and thereby, the time-slot assignment order therefor is determined.

Since a plurality of wireless terminals having the same amount of data in the buffers may also exist here, the slot assignment priority order determination unit 712/812 determines whether a plurality of wireless terminals having the same amount of data in the buffers exist. When they exist, for these wireless terminals, sorting is performed by the order of the maximum stay time (in a step 1205), and thereby, the time-slot assignment order therefor is determined.

After the time-slot assignment order is thus determined uniquely also for all the wireless terminals for each of which the maximum stay time has not exceeded the permissible time, the slot assignment unit 714/814 determines whether or not there are still any vacant slots (in a step 1206). When they exist or it exists, processing of assigning the vacant slots or slot to wireless terminals or terminal is performed (in a step 1207). The determination processing (in the step 1206) of whether or not there are any vacant slots and the time-slot assignment processing (in the step 1207) are repeated until time slots have been assigned to all the wireless terminals for each of which the maximum stay time has not exceeded the permissible time or no vacant slots remain.

Figure 15:
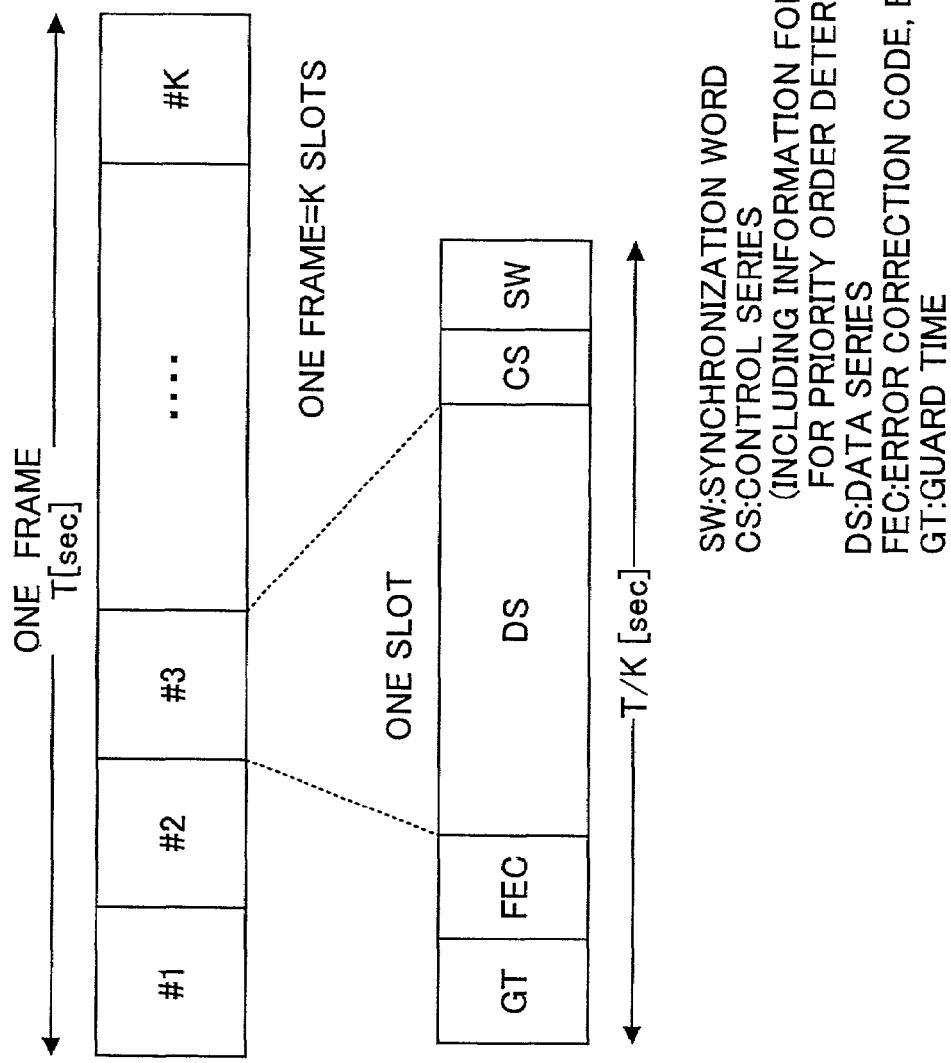
FIG. 15 shows an example of time-slot configuration in time division multiple access scheme.

Here, the determination method for determining the number of slots at the time of assigning time slots to each wireless terminal will now be described. FIG. 15 shows a time-slot configuration in one example in time division multiple access scheme. The information for the amount of data in the buffer is sent by a series for control (CS). Here, the amount of data in the buffer is assumed as D (bits).

Assuming that the number of modulation levels is 'n', and information of N (bits) can be sent by one symbol, the relationship of $N=\log_2 n$ holds. Then, assuming that the number of symbols (determined by the frequency band of the system) which can be transmitted by one slot is S (symbols), the number of bits which can be transmitted by one slot is SN (bits).

Therefore, the number of slots to be assigned in order to transmit D (bits) from the buffer is obtained as follows:

$$D/(SN)=D/(S\cdot\log_2 n)$$

That is, fewer slots should be assigned, as the number n of modulation levels is larger. Thus, by increasing the number n of modulation levels, it is possible to use wireless channels efficiently. In the wireless base station 1, processing of assigning vacant slots for the required time slots is performed for each wireless terminal according to the determined assignment order.

Next, a method of obtaining the maximum stay time of packets in the buffer will now be described. A packet to be transmitted is stored in the buffer in the wireless base station acting as the transmission end in case the packet is transmitted to each wireless terminal from the wireless base station. When a packet is transmitted to the wireless base station from each wireless terminal, the packet to be transmitted is stored in the buffer in the wireless terminal acting as the transmission end. These buffers are equivalent to the queues of FIFOs (First-In First-Out). The generation time of a packet is described at a header part of the packet stored there.

Since a newly generated packet is placed at the tail end of the buffer sequentially, the stay time (lapsed time after the packet is generated) of the packet at the top of the row, i.e., the packet to be sent out from the buffer subsequently, has the longest stay time among all the packets in the buffer. Therefore, the stay time of the packet at the top of the row of the buffer can be defined as the maximum stay time. In case a packet is transmitted to the wireless base station from each wireless terminal, each wireless terminal needs to notify this maximum stay time to the wireless base station 1.

Then, an operation flow starting from beginning of connection of the wireless base station with the wireless terminal to the termination of the connection will now be described with reference FIGS. 16 and 17.

Figure 16:
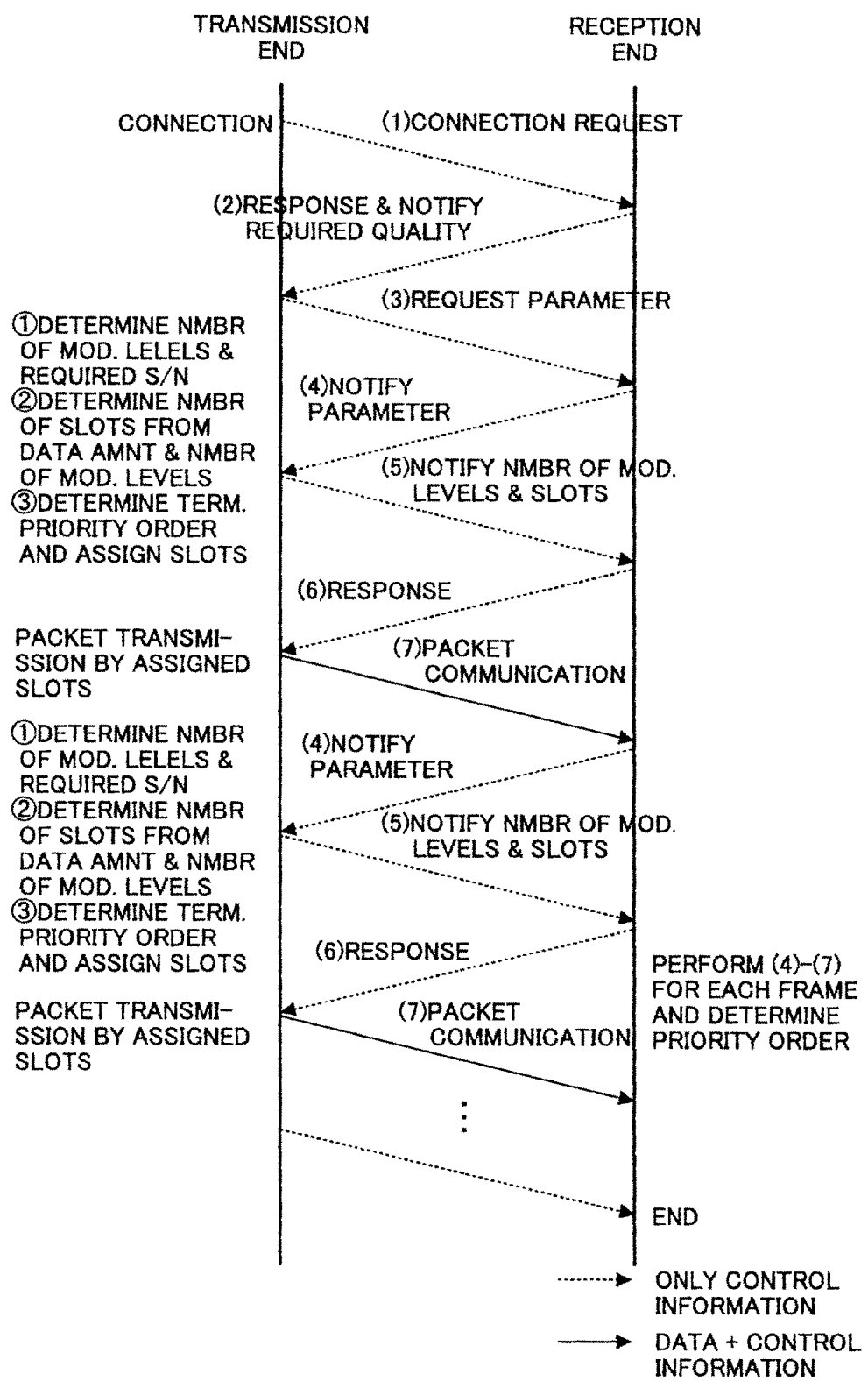
FIG. 16 shows a sequence illustrating an example of a flow starting from connection beginning and ending at a termination of the connection in case the wireless base station acts as a transmission end, and the wireless terminal acts as a reception end.

FIG. 16 shows an example in case the wireless terminal acts as the reception end while the wireless base station acts as-the transmission end. First, in case connection is started, the transmission end transmits a control signal for a connection demand to the reception side. While the reception end answers this connection demand, it notifies simultaneously also about a required communication quality (referred to as "required quality" below) when requiring the predetermined communication quality. The required quality includes the required rate (BER) of bit error and the permissible time for the maximum stay time of packets. The reception end should merely notify it to the transmission end only in case of the first connection, when the reception end requires them.

When the response to the connection demand reaches the reception end, the transmission end requires the parameter (s) for determining the time-slot assignment order. The reception end notifies the receiving signal-to-noise ratio as the parameter in response to this request.

By the method shown in FIG. 6 or 11, based on the thus-notified receiving signal-to-noise ratio, the data amount in the buffer and the maximum stay time of the packets in the buffer at the time, the transmission end determines the number of time slots to be assigned to each wireless terminal, determines the assignment order therefor, and assigns time slots to the respective wireless terminals. Moreover, in case of making variable the number of modulation levels, the reception end determines the number of modulation levels, and, also, determines the required receiving signal-to-noise ratio under the condition of the determined number of modulation levels by the method shown in FIG. 12.

The transmission end notifies the assigned time slots, and the changed number of modulation levels, if any, to the reception end. Then, when the response thereto has come back from the reception end, the transmission end starts transmission of the packets stored in the buffer.

The reception end notifies the receiving signal-to-noise ratio at the time as the parameter, when receiving the packets. The transmission end determines the assignment order for assigning time slots to each wireless terminal again based on this notified receiving signal-to-noise ratio, the amount of data in the buffer at the time, and the maximum stay time of the packets at the buffer. Thus, the assignment order for assigning time slots to each wireless terminal is updated for every frame, and it is repeated until the connection is terminated.

In addition, the processing of determining the number of modulation levels from the receiving signal-to-noise ratio and the processing of determining the time-slot assignment order may not be necessarily performed at the same cycle as mentioned above. Moreover, it is not necessary to necessarily perform the processing for every frame, but the processing may be performed every several frames. Since, as the cycle of the processing is shorter, the system characteristics may become better but the processing becomes more complicated. Accordingly, the time interval of the processing should be determined depending on a particular system design. However, in order for the signals from all the wireless terminals covered by the wireless base station to arrive thereat, a time interval for one frame is required. Accordingly, at least, the period for one frame is needed for the time interval of the above-mentioned processing.

Figure 17:
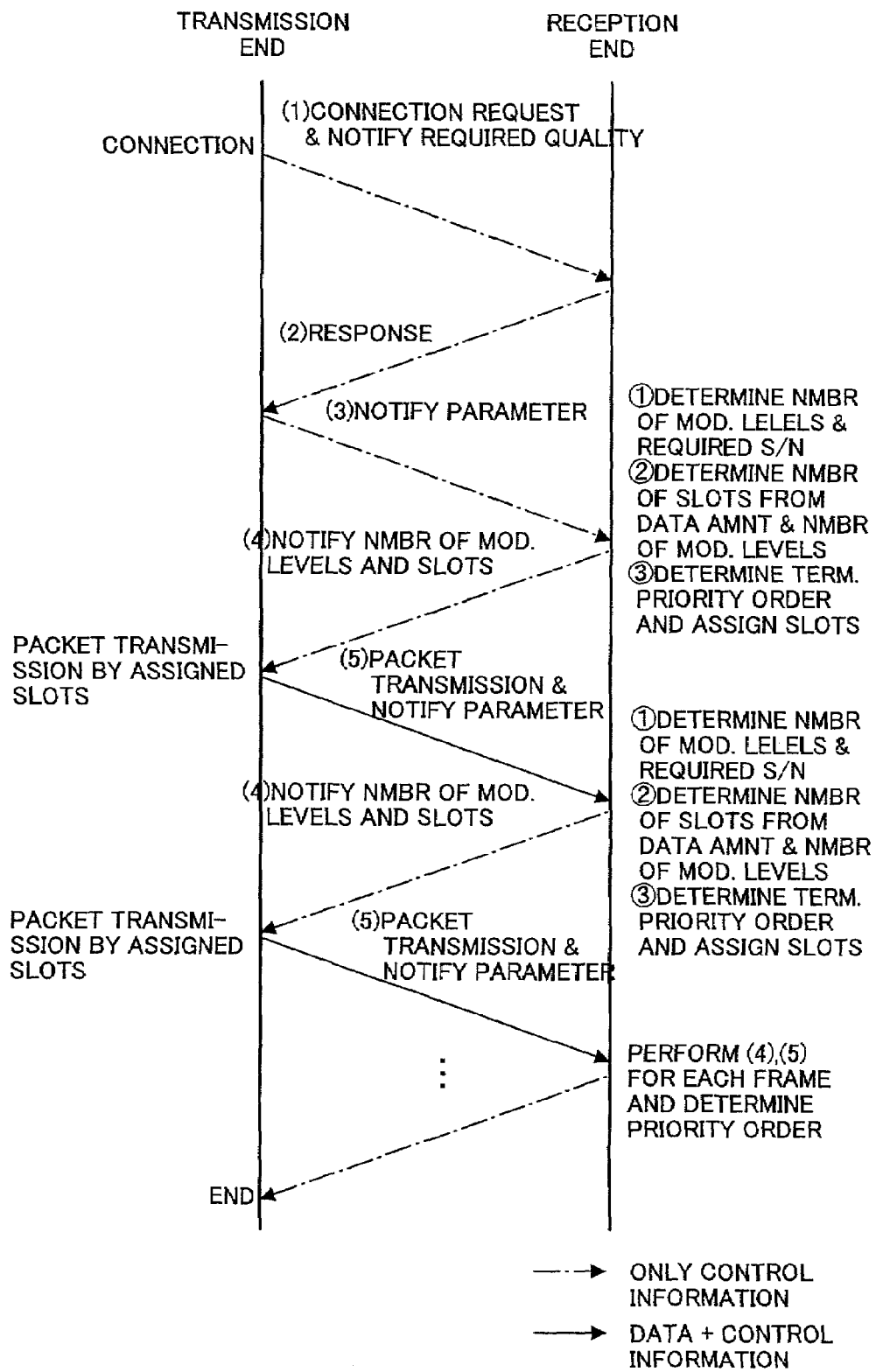
FIG. 17 shows a sequence illustrating an example of a flow starting from connection beginning and ending at a termination of the connection in case the wireless base station acts as the reception end, and the wireless terminal acts as the transmission end.

On the other hand, FIG. 17 shows an example in case the wireless base station acts as the reception end and each wireless terminal acts as the transmission end. First, in case connection is started, the transmission end transmits the control signal for the connection demand to the reception end. When the transmission end requires predetermined communication quality, it notifies to the reception end also the required quality.

When the response to the connection demand comes in response from the reception end, the transmission end notifies the parameter(s) for determining the time-slot assignment order. The parameter notified here includes the amount of data in the buffer and/or the maximum stay time of the packets in the buffer at this time. By the method shown in FIG. 6 or 11, based on the thus-notified parameter and the receiving signal-to-noise ratio, the reception end determines the number of time slots to be assigned every wireless terminal, and, also, determines the assignment order therefor, and, then, assigns time slots to each wireless terminal. Moreover, in order to make variable the number of modulation levels, by the method shown in FIG. 12, the reception end determines the number of modulation levels and, also, determines the required receiving signal-to-noise ratio in the thus-determined number of modulation levels.

When the assigned time slots, and the changed number of modulation levels if any, are notified by the reception end, the transmission end starts transmission of the packets stored in the buffer. The transmission end also notifies the amount of data in the buffer and the maximum stay time of the packets in the buffer collectively in that case. The reception end again determines the assignment order for assigning time slots to each wireless terminal based on the thus-notified parameter(s) and the receiving signal-to-noise ratio. Thus, the assignment for assigning time slots to each wireless terminal is updated for every frame, and it is repeated until the connection is terminated.

In addition, although the assignment order is determined based on the three parameters, i.e., the receiving signal-to-noise ratio, the amount of data, and the maximum stay time of the packets in the above described embodiments, it is also possible to determine the assignment order based only on two parameters, i.e., the receiving signal-to-noise ratio and the amount of data in the buffer, or on two parameters, i.e., the receiving signal-to-noise ratio and the maximum stay time of the packets.

Moreover, although the above-described embodiments employ the wireless channel assignment method which is in the case where time slots in time division multiple access scheme are assigned, it is also possible to assign frequency bands in frequency division multiple access scheme, spread codes in code division multiple access scheme, etc., in a similar manner.

Thus, through communication quality control according to the present invention, it is possible not only to effectively improve communication quality but also effectively reduce the stay time in each wireless terminal below a fixed value, to raise throughput, and thus to provide a superior wireless communication system.

Moreover, since the quality of wireless channel is observed for every frame and, then, assignment of time slots is performed for, from one having the better communication quality, throughput is improved, and, also, frequency use efficiency becomes better, by thus reducing the probability of re-sending of packets, and also, using the large number of modulation levels. Moreover, for one having not better quality, communication becomes possible by reducing the number of modulation levels, and performing control such as to prevent the rate of bit error from exceeding a fixed value. Therefore, a system performing the quality control according to the present invention is very satisfactory, when not only seen from the end of using the wireless terminal but also seen from the end of managing/operating the system.

Furthermore, by granting preferences to those having fewer amounts of data, it is possible that a larger number of wireless terminals can be connected to the wireless base station simultaneously. Since the terminals each having a large amount of data to be transmitted need large numbers of time slots, the stay times of the data thereof inevitably become large. In order to avoid such a situation, when a predetermined value of the stay time is exceeded, time slots are assigned with the priority to those wireless terminal, and thereby, the stay times of these wireless terminals are prevented from increasing too much.

Further, the present invention is not limited to the above-described embodiments, and variations and modifications may be made without departing from the scope of the present invention.

The present application is based on Japanese priority application No. 2000-297186, filed on Sep. 28, 2000, the entire contents of which are hereby incorporated by reference.

What is claimed is:

1. A communication apparatus which communicates with a plurality of wireless terminals, comprising:
    an assignment order determination unit which is arranged to determine an assignment order of wireless channels between said communication apparatus and said wireless terminals based on a maximum stay time of data to be transmitted from a transmission end for every reception and for wireless terminal; and
    a wireless channel assignment unit which is arranged to assign, according to the thus-determined assignment order, the wireless channels between said communication apparatus and said wireless terminals, including a wireless terminal classification unit which is arranged to classify each wireless terminal into a first wireless terminal for which the maximum stay time of the data to be transmitted or the data to be received has exceeded a predetermined time, or a second wireless terminal for which the maximum stay time of the data to be transmitted or the data to be received has not exceeded the predetermined time;
    wherein, when said communication apparatus acts as the reception end, said assignment order determination unit is arranged to determine said assignment order based on the communication quality measured in the said communication apparatus for each wireless terminal, and the maximum stay time of the data to be transmitted measured in each wireless terminal and the measured result sent to the said communication apparatus;
    and, said assignment order determination unit is arranged to give priority for the first wireless terminals over the second wireless terminals to determine the assignment order therefor.

2. The apparatus according to claim 1, wherein when said communication apparatus acts as the transmission end, said assignment order determination unit is arranged to determine the assignment order of the wireless channels based on the maximum stay time of the data to be transmitted measured in the said communication apparatus, and the communication quality measured in each wireless terminal.

3. The apparatus according to claim 1, wherein said assignment order determination unit is arranged to determine, for said first wireless terminals, said assignment order by the order of the maximum stay time of the data to be transmitted or the data to be received, and, then, the order of the communication quality, and, to determine, for said second wireless terminals, said assignment order by the order of the communication quality, and, then, the order of the maximum stay time of the data to be transmitted or the data to be received.

4. The apparatus according to claim 1, wherein, based on the maximum stay time and the amount of data to be transmitted or the data to be received, and the communication quality, said assignment order determination unit is arranged to determine said assignment order.

5. The apparatus according to claim 4, wherein said assignment order determination unit is arranged to determine, for said first wireless terminals, said assignment order by the order of the maximum stay time of the data to be transmitted or of the data to be received, the order of the communication quality, and, then, the ascending order of the amount of the data to be transmitted or the data to be received, and, to determine, for said second wireless terminals, said assignment order by the order of the communication quality, the ascending order of the amount of data to be transmitted or the data to be received, and, then, the order of the maximum stay time of the data to be transmitted or the data to be received.

6. The communication apparatus according to claim 1, wherein said assignment order determination unit is arranged to determine said assignment order between said communication apparatus and said wireless terminals based on the communication quality at the reception end for every wireless terminal by, determining the assignment order of the wireless channels between said communication apparatus and said wireless terminals based on the number of modulation levels corresponding to the communication quality at the reception end for every wireless terminal.

7. A method of assigning wireless channels in a communication apparatus which communicates with a plurality of wireless terminals, comprising:

a) determining an assignment order of wireless channels between said communication apparatus and said wireless terminals based on a maximum stay time of data to be transmitted from a transmission end for every wireless terminal, and the communication quality at a reception end for every wireless terminal; and b) assigning, according to the thus-determined assignment order, the wireless channels between said communication apparatus and said wireless terminals, that when said communication apparatus acts as the reception end, said step a) includes a step of determining the assignment order of the wireless channels based on the communication quality measured in said communication apparatus for each wireless terminals, and the maximum stay time of the data to be transmitted measured in each wireless terminal and the measured result sent to the said communication apparatus; and c) classifying each wireless terminals into a first wireless terminal for which the maximum stay time of the data to be transmitted or the data to be received has exceeded a predetermined time, or a second wireless terminal for which the maximum stay time of the data to be transmitted or the data to be received has not exceeded the predetermined time.

wherein, said step a) includes the steps of giving priority for the first wireless terminals over the second wireless terminals to determine the assignment order.

8. The method according to claim 7, wherein when said communication apparatus acts as the transmission end, said step a) includes a step of determining said assignment order based on the maximum stay time of the data to be transmitted measured in said communication apparatus, and the communication quality measured in each wireless terminal.

9. The method according to claim 7, wherein said step a) further comprises the steps of determining, for said first wireless terminals, said assignment order by the order of the maximum stay time of the data to be transmitted or the data to be received, and, then, the order of the communication quality, and, while determining, for said second wireless terminals, said assignment order by the order of the communication quality, and, then, the order of the maximum stay time of the data to be transmitted or the data to be received.

10. The method according to claim 7, wherein said step a) further comprises a step of determining said assignment order, based on the maximum stay time and the amount of the data to be transmitted, and the communication quality.

11. The method as claimed in claim 10, wherein said step a) further comprises the steps of determining, for said first wireless terminals, said assignment order by the order of the maximum stay time of the data to be transmitted or the data to be received, the order of the communication quality, and, then, the ascending order of the amount of the data to be transmitted or the data to be received, and, while determining, for said second wireless terminals, said assignment order by the order of the communication quality, the ascending order of the amount of the data to be transmitted or the data to be received, and, then, the order of the maximum stay time of the data to be transmitted or the data to be received.

12. The method according to claim 7, wherein said step a) further comprises the step of determining said assignment order between said communication apparatus and said wireless terminals based on the communication quality at the reception end for every wireless terminal, by determining said assignment order between said communication apparatus and said wireless terminals based on the number of modulation levels corresponding to the communication quality at the reception end for every wireless terminal.

* * * * *